United States Patent [19]

Everett, Jr. et al.

[11] Patent Number: 5,307,271
[45] Date of Patent: Apr. 26, 1994

[54] REFLEXIVE TELEOPERATED CONTROL SYSTEM FOR A REMOTELY CONTROLLED VEHICLE

[75] Inventors: Hobart R. Everett, Jr.; Gary A. Gilbreath, both of San Diego, Calif.

[73] Assignee: The United States of America as represented by the Secretary of the Navy, Washington, D.C.

[21] Appl. No.: 593,418

[22] Filed: Sep. 28, 1990

[51] Int. Cl.$^5$ .................... G06F 15/50; B62D 1/24
[52] U.S. Cl. .................... 364/424.02; 180/169; 318/568.12; 395/88
[58] Field of Search .................... 364/424.01, 424.02, 364/474.12; 180/167, 168, 169; 318/568.12; 395/88; 901/49

[56] References Cited

U.S. PATENT DOCUMENTS

| | | | |
|---|---|---|---|
| 4,307,791 | 12/1981 | De Bruine | 180/168 |
| 4,328,545 | 5/1982 | Halsall et al. | 364/424.02 |
| 4,530,056 | 7/1985 | MacKinnon et al. | 364/424.02 |
| 4,593,238 | 6/1986 | Yamamoto | 318/587 |
| 4,593,239 | 6/1986 | Yamamoto | 318/587 |
| 4,626,995 | 12/1986 | Lofgren et al. | 364/424.02 |
| 4,674,048 | 6/1987 | Okumura | 364/424.02 |
| 4,746,977 | 3/1988 | White | 364/424.02 |
| 4,751,658 | 6/1988 | Kadonoff et al. | 364/424.01 |
| 4,773,018 | 9/1988 | Lundström | 364/443 |
| 4,780,817 | 10/1988 | Lofgren | 364/424.01 |
| 4,790,402 | 12/1988 | Field et al. | 180/169 |
| 4,802,096 | 1/1989 | Hainsworth et al. | 364/461 |
| 4,811,228 | 3/1989 | Hyyppä | 364/424.02 |
| 4,811,229 | 3/1989 | Wilson | 364/424.02 |
| 4,817,000 | 3/1989 | Eberhardt | 364/443 |
| 4,846,297 | 7/1989 | Field et al. | 180/169 |
| 4,857,912 | 8/1989 | Everett, Jr. et al. | 340/825.3 |
| 4,858,132 | 8/1989 | Holmquist | 364/424.02 |
| 4,875,172 | 10/1989 | Kanayama | 364/424.02 X |
| 5,001,635 | 3/1991 | Yasutomi et al. | 364/424.02 |
| 5,032,775 | 6/1991 | Mizuno et al. | 364/424.02 X |
| 5,107,946 | 4/1992 | Kamimura et al. | 180/169 |
| 5,111,401 | 5/1992 | Everett, Jr. et al. | 364/424.02 |

OTHER PUBLICATIONS

"Teleautonomous Guidance for Mobile Robots," Borenstein et al., IEEE Transactions on Systems, Man, and Cybernetics, vol. 20, No. 6, Nov./Dec. 1990, pp. 1437-1443.

"Robart II A Robotic Security Testbed," Everett et al., Technical Document 1450, Naval Oceans Systems Center, Jan. 1989.

Primary Examiner—Thomas G. Black
Assistant Examiner—Thomas S. Auchterlonie
Attorney, Agent, or Firm—Harvey Fendelman; Thomas Glenn Keough; Michael A. Kagan

[57] ABSTRACT

A control system for a remotely controlled vehicle comprises a supervisory control system which receives supervisory speed and turn rate commands from a human operator which are provided to a servo-controlled vehicle; an obstruction detection system having multiple sensors mounted to the vehicle detect any obstructions in the path of the vehicle; and a collision avoidance control system coupled to the supervisory control system, the obstruction detection system, and to the vehicle. The collision avoidance control system disables the supervisory speed and turn rate commands when the obstruction detection system detects an obstruction. The collision avoidance control system also generates and provides obstacle avoidance speed and turn rate commands to the vehicle to direct the vehicle to avoid obstruction in the path of the vehicle, and enables the supervisory speed and turn rate commands after the obstruction is avoided so that control of the vehicle is returned to the human operator. The magnitude of the obstacle avoidance speed command is proportional to a first distance between one of the sensors detecting the obstruction and the obstruction itself when the first distance is within a first predetermined limit; and the magnitude of the turn rate command is inversely proportional to an angle defined between an operator desired vehicle heading and a relative bearing to the detected obstruction when the obstruction is within a second distance from the vehicle.

8 Claims, 21 Drawing Sheets

REFLEXIVE TELEOPERATED CONTROL SYSTEM FOR A REMOTELY CONTROLLED VEHICLE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The present invention relates to the field of robotics and remotely guided vehicles. More particularly, the present invention relates to an automatic system for supplementing human direction of a servo-controlled, remotely guided vehicle.

Remotely operated platforms have been employed for a variety of applications dating back to World War II. Recent advances in the applicable technologies have brought about an even greater interest in such systems for use in hazardous environments, such as those found in the nuclear power industry, underwater search and recovery, fire-fighting, and bomb disposal, to name but a few. Often, however, the advantages afforded by removing the operator from a dangerous situation are significantly offset by the subsequent difficulties encountered in controlling the remote platform. Thus, the number of practical applications for tele-operated systems are limited to those for which the perils associated with direct human exposure justify the operational difficulties associated with such systems.

One of the fundamental problems with tele-operated systems is control of vehicle motion based on visual feedback provided to the operator, as for example, by an onboard camera. Loss of depth perception and impaired visual acuity are perhaps the most important factors that limit the potential effectiveness of such systems.

Much work has been done over the past decade to improve the man-machine interface for tele-operated systems in an attempt to achieve a higher operational equivalence ratio, which can be loosely defined as the amount of time it takes a human to directly perform a series of tasks, divided by the amount of time it would take an operator to perform the same tasks remotely. One type of remote telepresence system provides stereo vision as well as binaural hearing to give the operator a stronger sense of actually being in the working environment. Head-coupled displays have been employed to further enhance this feeling, wherein a pair of high-resolution cameras on the remote (slave) end are positioned in real-time in accordance with the pan and tilt movements of a helmet worn by the operator at the (master) control station. The helmet is equipped with miniature monitors to relay the video from the left and right cameras to the left and right eyes of the operator, thus providing some degree of depth perception. As the operator turns his head toward elements of interest in the scene being viewed, the remote slave positions the cameras accordingly to achieve the desired input. While the 3-D capability thus provided is a decided improvement over monocular vision, the negative side effects include extremely high operator fatigue, a tendency to induce nausea in some operators, higher bandwidth requirements in the control loop, and significantly enhanced system complexity.

Therefore, there is a need for a system which supplements human operator control of a remote controlled mobile platform by automatically adjusting the speed and direction of the platform as a function of environmental congestion. A further need exists for a system which greatly reduces operator fatigue over present teleoperated mobile platforms, and which eliminates the possibility of collisions with obstacles in the path of the platform.

SUMMARY OF THE INVENTION

A control system for a remotely controlled vehicle comprises first means which receives supervisory speed and turn rate commands from a human operator which are provided to a servo-controlled vehicle. Second means having multiple sensors mounted to the vehicle detect any obstructions to the vehicle path. Third means coupled to the first and second means, and to the vehicle disables the supervisory speed and turn rate commands when the second means detects an obstruction. The third means also generates and provides obstacle avoidance speed and turn rate commands to the vehicle to direct the vehicle to avoid the obstruction, and enables the supervisory speed and turn rate commands after the obstruction is avoided so that control of the vehicle is returned to the human operator. The magnitude of the obstacle avoidance speed command is proportional to a first distance between one of the sensors detecting the obstruction and the obstruction itself when the first distance is within a first predetermined limit; and the magnitude of the turn rate command is inversely proportional to an angle defined between an operator desired vehicle heading and a relative bearing to the detected obstruction when the obstruction is within a second distance from the vehicle.

Reflexive teleoperation, as provided by the present invention, provides a robust means for remote operation of an unmanned vehicle, which frees the human operator from the lower level concerns associated with direct teleoperation. Such low level concerns which are obviated by the present invention include maneuvering necessary to avoid obstacles in the path of the vehicle, and the formulation of decisions necessary to implement such maneuvering, as for example, speed and heading of the vehicle. When a remote controlled vehicle is operated in the reflexive teleoperation mode of the present invention, vehicle speed and direction are servo-controlled by an onboard processor of the third means as a function of the surrounding environment in response to local sensor inputs, but under the high-level supervisory control of the remote operator.

To best appreciate the advantages of the present invention, an analogy is made to a person riding a horse, as compared to one riding a motorcycle. A motorcycle has absolutely no inherent intelligence; the driver must attend to every detail regarding steering and velocity of travel, or suffer the consequences. A horse, on the other hand, can be directed to follow an equivalent route by periodic "high level" prompts, as for example through the reins or stirrups. The rider then supervises the resulting actions of the horse, making corrections as necessary if the horse deviates from the intended path. The important point to note for purposes of this analogy is that the horse can make certain decisions on its own. It can negotiate an opening between trees, for example, and is smart enough not to run into surrounding obstacles, or fall into a ditch. The rider does not have to concentrate on avoiding these obstacles.

The reflexive teleoperation control system of the present invention is similar to that associated with the horse in the preceding example. The invention provides a similar type of control to the remote platform, by providing a degree of "local intelligence" which seeks out openings between obstructions. This virtually eliminates the possibility of collisions in cluttered environments, while providing the important benefit of significantly reducing the stress and fatigue imposed upon the human operator typically associated with conventional remote operation of a mobile system.

The human operator, sitting at a console remote from the vehicle, can effect a hand-off from autonomous to teleoperated control by calling up the "Teleoperated Mode" through the system menu of the first means. The onboard dead-reckoning software implemented in the third means keeps track of the position and heading of the vehicle while executing drive commands provided directly from the control console input of the first means. This mode could be used to explore some new area (mapping the surroundings in the process if so desired), or to move expeditiously to a new location, or around a perceived threat which may not be obvious to the robot. At any time, the operator can disable the reflexive mode and resume direct teleoperation of the vehicle.

DESCRIPTION OF THE PREFERRED EMBODIMENT

The present invention is a reflexive teleoperated control system ("RTCS") for a remote platform that provides a system for supplementing human control of the direction and speed of a servo-controlled vehicle in order to free the operator from lower-level concerns associated with direct teleoperation of the vehicle.

Figure 1:
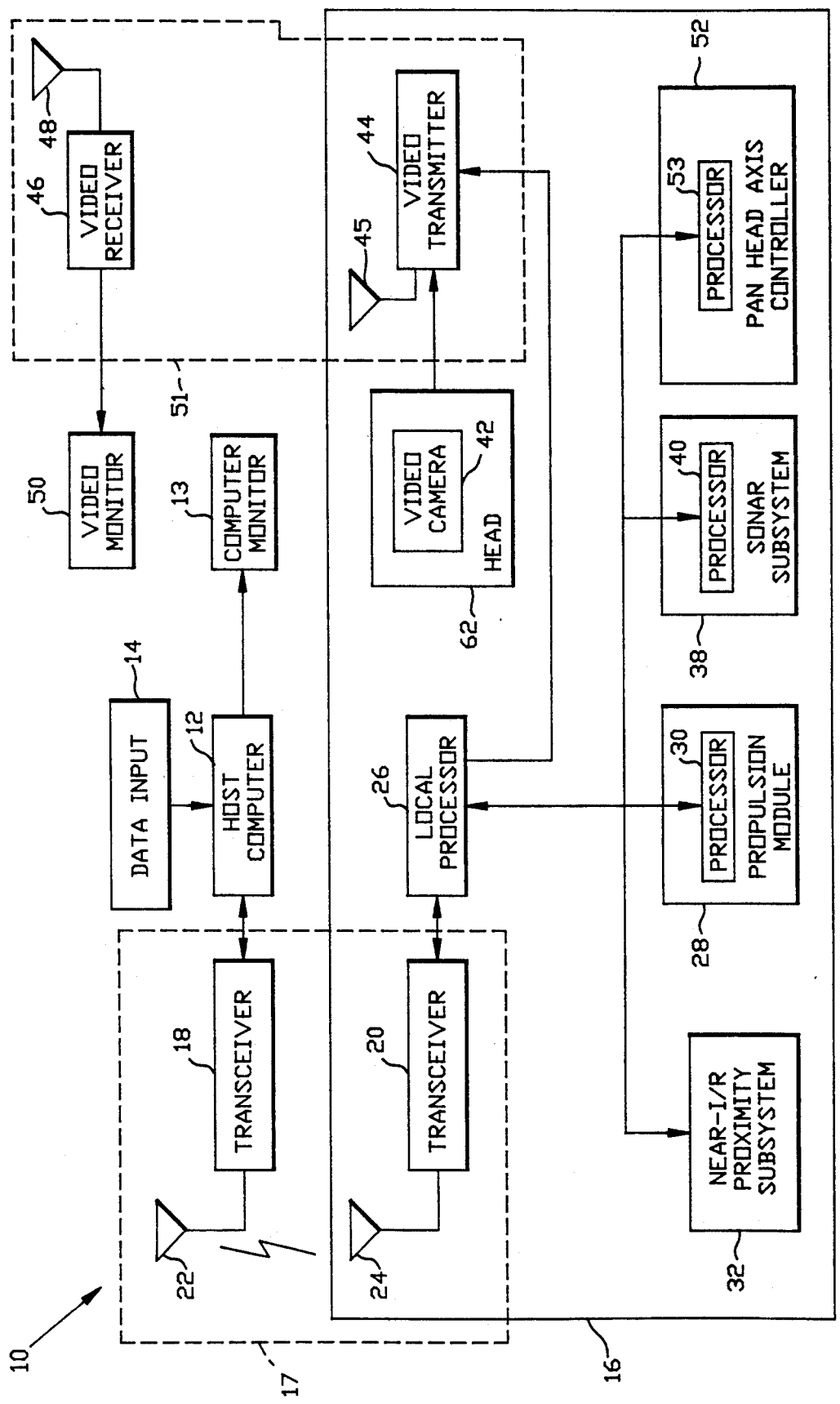
FIG. 1 is a functional block diagram of a reflexive teleoperated control system for a remotely controlled mobile platform of the present invention.
Figure 2:
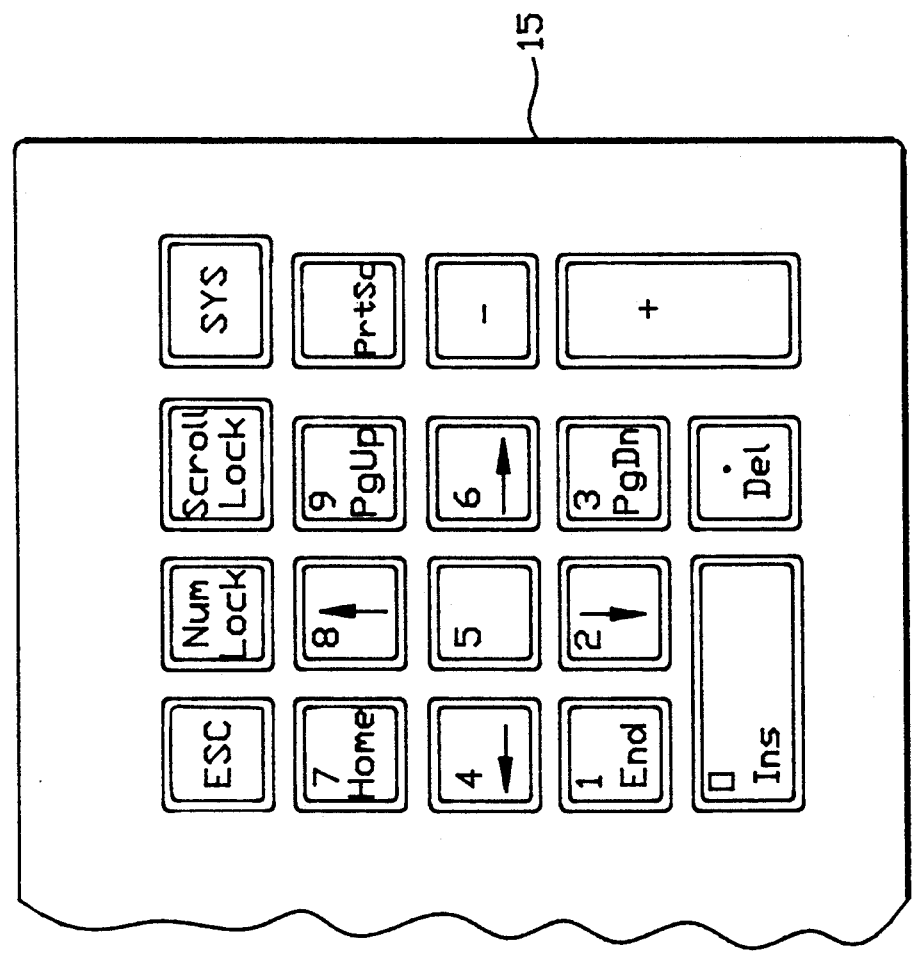
FIG. 2 illustrates a numeric keypad for providing commands to the vehicle.

Referring to FIG. 1, RTCS 10 is shown to include host computer 12 which receives manually input commands from a human operator through data input device 14, such as standard computer keyboard having a numeric keypad 15, which may be of the type illustrated in FIG. 2. Other examples of suitable input devices include a joystick, mouse, touch screen display, voice recognition system, or steering wheel. Data from host computer 12 is provided to remote vehicle 16 through communication link 17 comprised of transceivers 18 and 20, and antennas 22 and 24. This data is received by local processor 26 which coordinates the operation of: 1) propulsion module 28 through processor 30; 2) near infrared-proximity subsystem 32; 3) sonar subsystem 38 through processor 40; and 4) head pan axis controller 52 through processor 53. Video camera 42 is mounted to head 62 which in turn is rotatively mounted to vehicle 16, and provides video signals to video transmitter 44 having antenna 45. The video signals are received by video receiver 46 having antenna 48 and are provided to video monitor 50, which displays video images of the environment in which vehicle 16 is operating. Video camera 42 is remotely controlled by pan axis controller 52 which orients camera 42 in accordance with commands by local processor 26. Video transmitter 44, video receiver 46, video camera 42, and video monitor 50 comprise video communication system 51. Pan axis controllers for orienting video cameras are well known by those skilled in this art. Pan axis controllers, suitable for employment in the present invention, are commercially available and well known by those skilled in this field of technology. Computer monitor 13 is coupled to host computer 12 and displays the operating characteristics of vehicle 16 such as speed, heading, rate of turn, latest entered command, and operating mode, i.e., teleoperated, seek, or reflexive.

Sonar subsystem 38, described with reference to FIGS. 5–9, collectively, detects potential obstacles in the path of vehicle 16 and provides data to processor 26 which calculates a modified path which avoids such obstacles. Near-infrared proximity subsystem 32 detects objects with reflected near-infrared energy that may present obstacles to the path of vehicle 16. The use of both sonic subsystem 38 and near-infrared proximity subsystem 32 increases the overall probability of detection of obstacles that may impede the motion of vehicle 16 in comparison with that which would be realized with either system alone. Each system can detect certain targets the other cannot. For example, the shorter wavelength of near-infrared energy greatly reduces problems associated with specular reflection, and as a result, significantly improves chances of detecting a sharply-angled target surface which the ultrasonic system may miss entirely. On the other hand, near-infrared energy will pass right through a glass door or window (which therefore, is undetected), whereas ultrasonic energy will be reflected, and more likely detected.

Sonar subsystem 38 and near-infrared proximity subsystem 32 provide data to local processor 26 which is used to determine the presence or absence of obstacles that may obstruct the path of remote vehicle 16. Local processor 26 interprets these data and if an obstacle to the path of vehicle 16 is detected, provides instructions to propulsion module 28 so as to avoid such obstacles, while vehicle 16 generally continues along its overall path in accordance with commands received from the human operator. The operating software of processor 26 may be programmed in a high level language such as "C", or in an assembly language, such as 6502, in accordance with well known techniques. The software is described further herein.

REMOTE VEHICLE

Remote vehicle 16 includes the following major subsystems: 1) local processor 26; 2) propulsion module 28; 3) near infrared-proximity subsystem 32; 4) sonar subsystem 38; and 5) head pan axis controller 52.

PROPULSION MODULE

Figure 3:
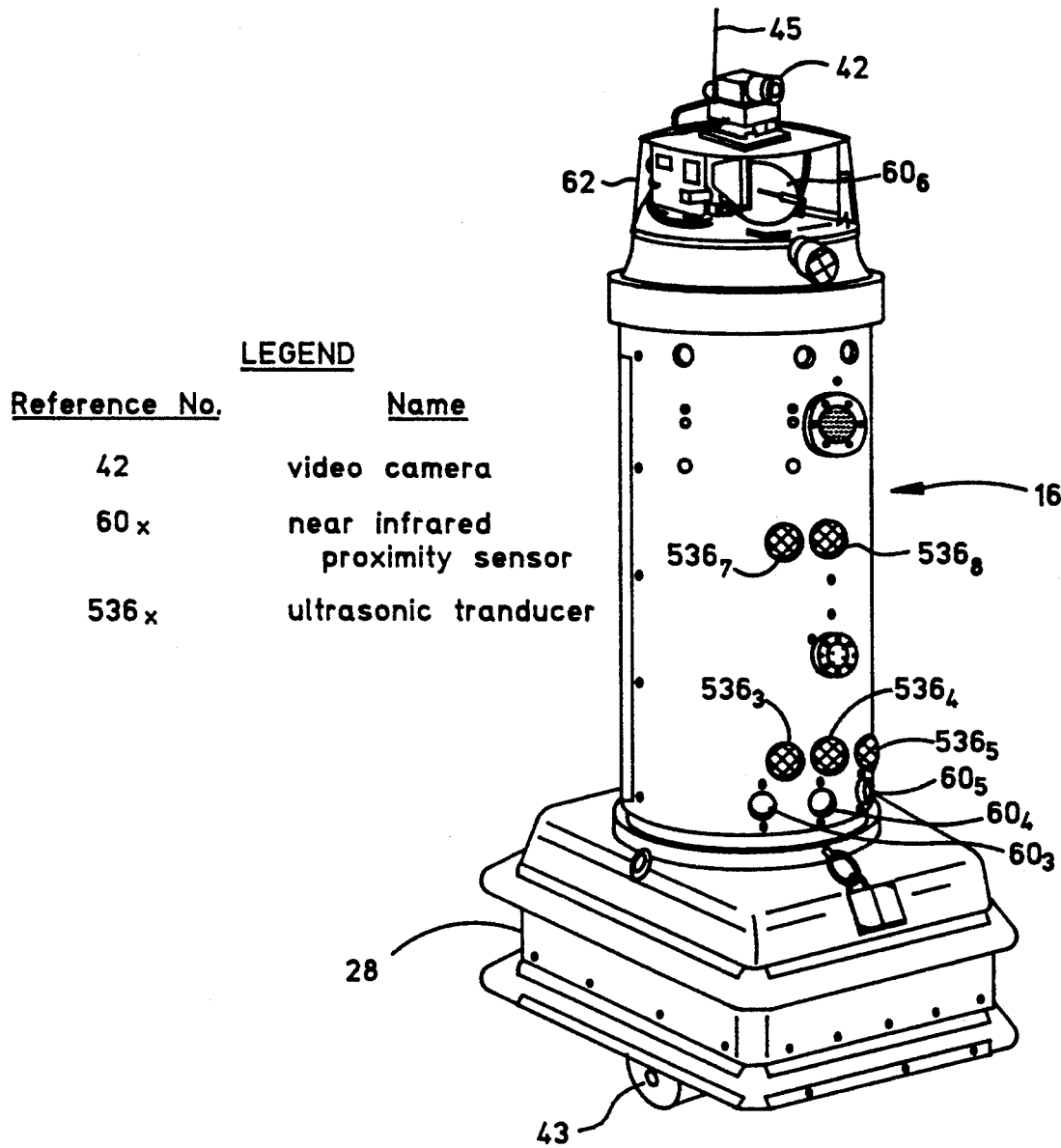
FIG. 3 is a perspective view of one embodiment of the vehicle of the present invention.
Figure 4:
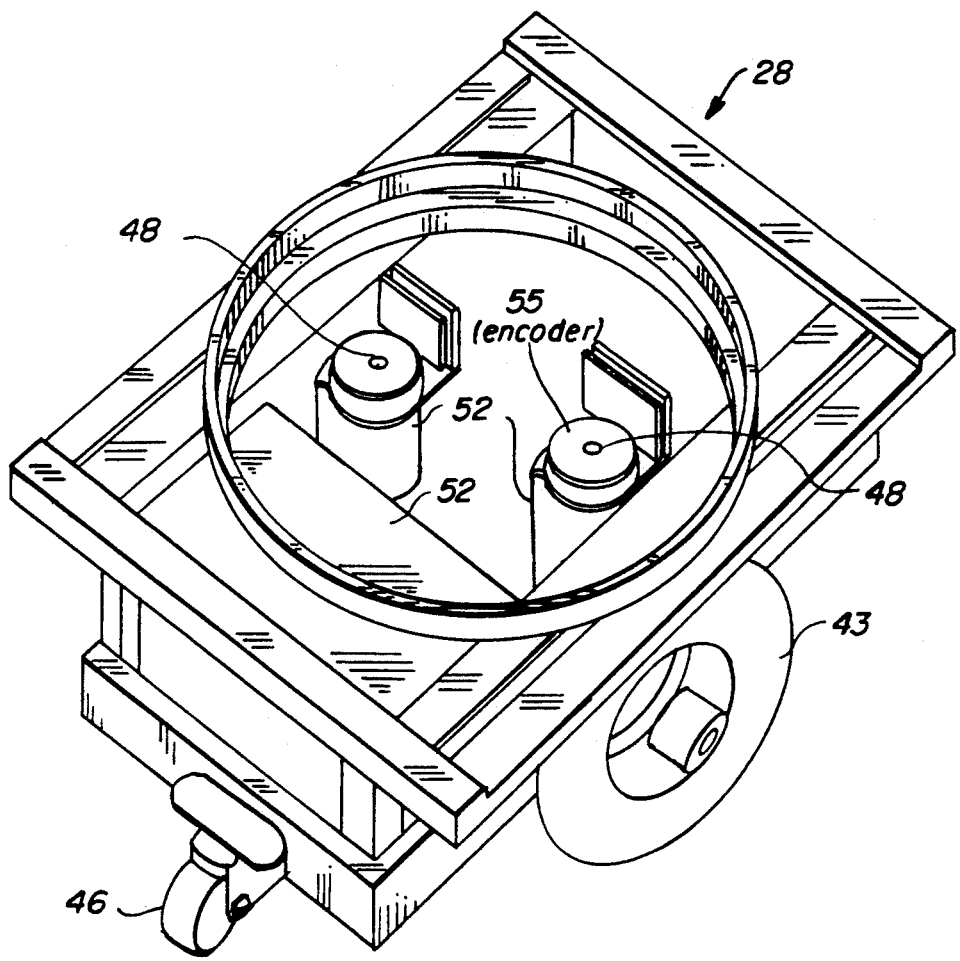
FIG. 4 is a top, perspective view of the computer-controlled propulsion module of the autonomous vehicle illustrated in FIG. 3.

Propulsion module 28 is a mobility platform which receives instructions from host computer 12 through local processor 26 and movement commands from processor 26 which direct the speed and direction of travel of propulsion module 28. Referring to FIGS. 3 and 4, propulsion module 28, by way of example, includes a pair (only one wheel 43 is shown in each of FIGS. 3 and 4) of coaxially aligned wheels 43 which are each driven by separate motors 44 which enable propulsion module 28 to be differentially steered by rotating each wheel 43 by different amounts, both in angular displacement and direction. Wheels 43, may for example, have 8-inch rubber tires, which when coupled with motors 44, provide a quiet, powerful propulsion subsystem with minimal wheel slippage. Passive casters 46 mounted to propulsion module 28 provide the latter with stability. Armature shafts 48 of motors 44 are each coupled to a high-resolution optical rotary shaft encoder 55 that provides phase-quadrature, square-wave outputs, where each square-wave output corresponds to a specific increment of angular displacement of a wheel 43. By way of example only, in the preferred embodiment, encoders 55 each produce 200 counts per revolution of armature shaft 48, which translates to 9725 counts per revolution of wheel 43. Commands from local processor 26 and host computer 12 direct the kinematics of propulsion module 28, as for example, heading, velocity, and acceleration. Power to operate remote vehicle 16 is provided by battery 52.

Servo-controlled propulsion modules of the type employed in the present invention and described herein are commercially available. One example of such a propulsion module is the "LabMate," manufactured by Transitions Research Corporation, 15 Great Pasture Road, Danbury, Conn. 06810. However, it is to be understood that the scope of the invention also includes the use of other servo-controlled propulsion modules besides the one described herein.

Processor 30 is typically provided as a component of commercially available propulsion modules of the type employed in the preferred embodiment of the present invention.

Referring to FIG. 1, commands, by way of example, are passed by local processor 26 to processor 30 of propulsion module 28 over a serial or parallel bus as a series of hexadecimal bytes which specify: (1) the direction in which to move or pivot, (2) the velocity, and, (3) the duration (distance or number of degrees). In the preferred embodiment, these commands are:

| | |
|---|---|
| Byte 1 | Type Motion Requested (00 to 07) |
| | 00 - Move forward |
| | 01 - Move reverse |
| | 02 - Pivot left |
| | 03 - Pivot right |
| | 04 - Offset left |
| | 05 - Offset right |
| | 07 - Stop |
| Byte 2 | Requested Velocity |
| | Upper nibble is the port motor velocity; |
| | Lower nibble is the starboard motor velocity. |
| Byte 3 | Distance to Move (Inches) or, |
| | Duration of Pivot (Degrees) or, |
| | Amount of Offset (Tenths of Degrees) |

The theoretical underpinnings by which mobile platform 28 is steered are discussed below.

Figure 11:
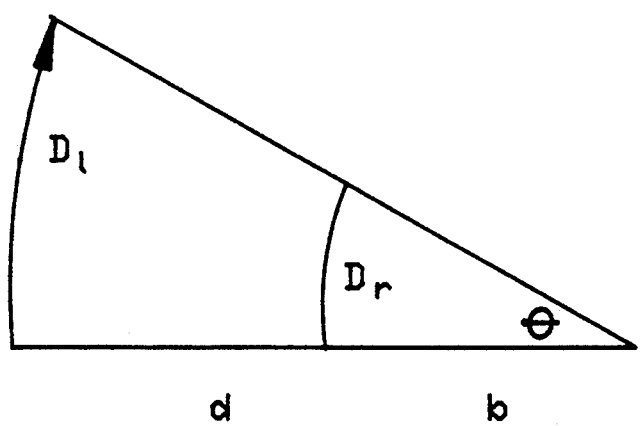
FIG. 11 represents portions of circles traced by the left and right wheels traveling at different but constant velocities, for a change in heading of the autonomous vehicle.

Unit displacement D along the path of travel is given by the equation $$D = \frac{D_l + D_r}{2} \quad (1)$$

where
$D_l$ = displacement of left wheel 43
$D_r$ = displacement of right wheel 43
Similarly, the platform velocity V is given by the equation $$V = \frac{V_l + V_r}{2} \quad (2)$$

where
$V_l$ = velocity of left wheel 43
$V_r$ = velocity of right wheel 43
Referring to FIG. 11, arc $D_l$ represents a portion of the circumference of a circle of radius d+b.

$$C_l = 2\pi(d+b) \quad (3)$$

where
$C_l$ = Circumference of circle traced by left wheel 43
d = Distance between left and right drive wheels 43
b = Inner turn radius
In addition, the relationship $$\frac{D_l}{C_l} = \frac{\Theta}{2\pi} \text{ yields } C_l = \frac{2\pi D_l}{\Theta} \quad (4)$$

Combining equations 3 and 4 and solving for $\Theta$ $$\Theta = \frac{D_l}{d+b} \quad (5)$$

Similarly, the shorter arc $D_r$ represents a portion of the circumference of a circle of radius b.

$$C_r = 2\pi b \qquad (6)$$

where $C_r$ = Circumference of circle traced by right wheel 43,

And the relationship $$D_r/C_r = \Theta/(2\pi) \text{ yields } C_r = (2\pi D_r)/\Theta \qquad (7)$$

Combining equations 6 and 7 and solving for b $$b = \frac{D_r}{\Theta} \qquad (8)$$

Substituting this expression for b into equation 5

$$\Theta = \frac{D_l}{d + \frac{D_r}{\Theta}} = \frac{D_l - D_r}{d} \qquad (9)$$

Figure 12:
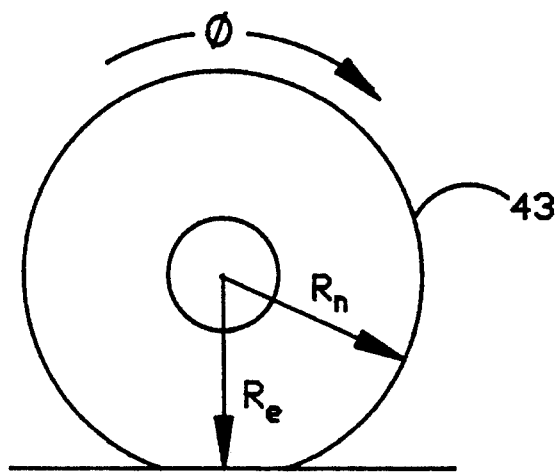
FIG. 12 illustrates the effective wheel radius of the drive wheels of the propulsion module of the autonomous vehicle.

Note that this expression for the change in vehicle orientation $\Theta$ is a function of the displacements of the left and right drive wheels 43 and is completely independent of the path taken. Referring now to FIG. 12, wheel 43 displacement $D_l$ is given by the equation $$D_l = R_{el}\phi \qquad (10)$$

where $R_{el}$ = effective left wheel 43 radius
$\phi$ = wheel rotation (radians)

Expressing in terms of encoder counts yields $$D_l = \frac{2\pi N_l}{9,725} R_{el} \qquad (11)$$

where $N_l$ = number of counts left encoder 55

Similarly, for the right drive wheel 43

$$D_r = \frac{2\pi N_r}{9,725} R_{er} \qquad (12)$$

where $N_r$ = number of counts right shaft encoder 55
$R_{er}$ = effective right wheel 43 radius Thus, it can be appreciated that the speed and direction of a remote vehicle may be precisely controlled by imparting a series of instructions that result in rotation of each wheel by specific amounts per unit of time.

Although the propulsion module 28 employed in the preferred embodiment of the present invention has been described as having differential steering, the scope of the present invention also includes use of mobile platforms which employ other types of steering systems. For example, another suitable propulsion module would be the Navmaster, manufactured by Cybermotion, which has a synchronous drive steering system.

SONAR SUBSYSTEM

Sonar subsystem 38, described with reference to FIGS. 5-9, collectively, detects potential obstacles in the path of vehicle 16 and provides data to processor 26 which calculates a modified path which avoids such obstacles. Processor 26 then sends commands to processor 30 that direct the velocity and direction of motion of propulsion module 28, accordingly.

Figure 5:
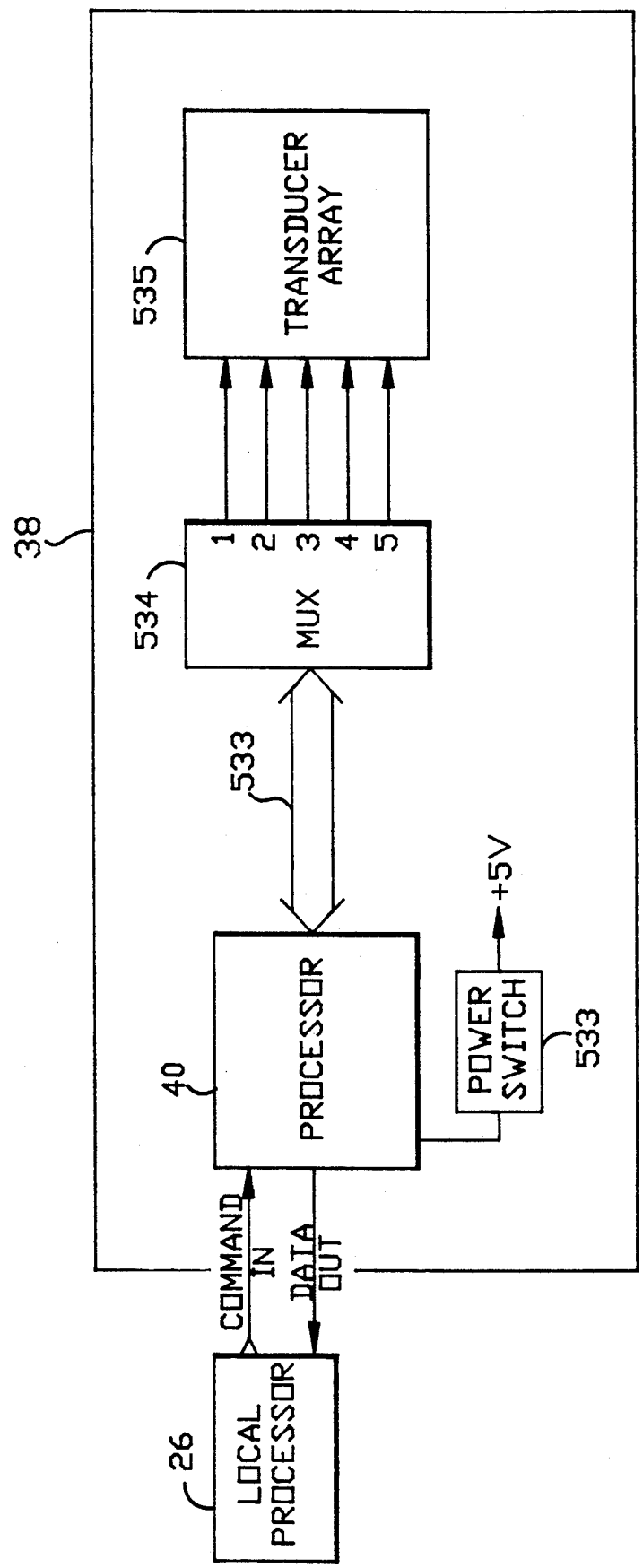
FIG. 5 is a functional block diagram of the sonar subsystem of the present invention.

Referring specifically to FIG. 5, processor 40 of sonar subsystem 38 controls multiplexer 534 which selectively activates ultrasonic transducers $536_i$ of transducer array 535, such that transducers $536_i$ are selectively enabled to transmit ultrasonic pulses, where i is an index corresponding to a particular transducer in array 535. Transducers $536_i$ then listen for any returning echoes. Returning echoes received by any of transducers $536_i$ indicate the presence of a target, which may be an obstacle, as described in greater detail further herein. Referring to FIGS. 5-9, collectively, in the preferred embodiment, transducer array 535, may for example, consist of 5 active ultrasonic ranging sensors $536_i$, where $i$ includes indices 3, 4, 5, 7, and 8, and may be mounted on vehicle 16 as shown in FIG. 3. Processor 40 is enabled by local processor 26 and is operably coupled to multiplexer 534 so as to provide outputs which selectively and sequentially activate transducers $536_i$.

Figure 6:
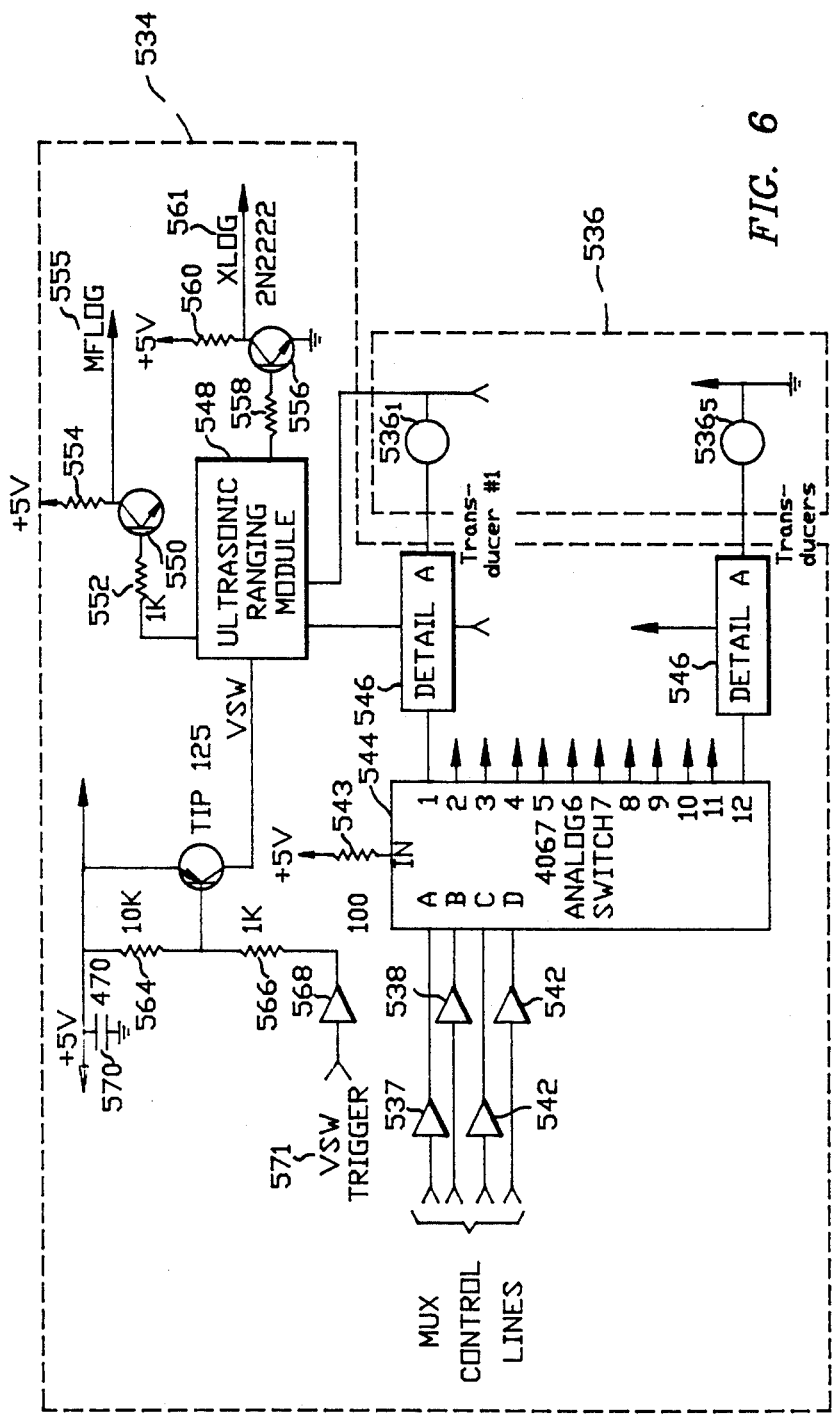
FIG. 6 is a schematic electrical diagram of the multiplexer depicted in FIG. 5.
Figure 7:
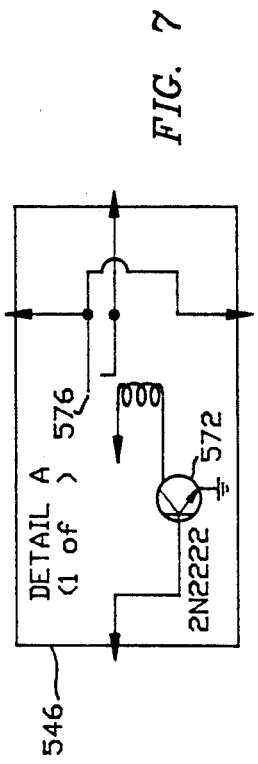
FIG. 7 is a schematic electrical diagram of the transducer switching relay (Detail A) of FIG. 6.

The details of multiplexer 534 are illustrated generally in FIGS. 6 and 7. The five ultrasonic transducers $536_i$ are interfaced to ultrasonic ranging module 548 through 12-channel multiplexer 544, in such a way that only one transducer, $536_i$, is fired at a time. Multiplexer 534 may be designed around a 4067 analog switch, as shown in FIG. 6. The ultrasonic ranging module 548 may be a "Polaroid" ranging module, Model No. SN28827. Processor 40 thus "sees" only one transducer $536_i$ at a time through ranging module 548 and multiplexer 534. The software of processor 40 merely executes in a loop, each time incrementing the index, i, which thus enables another transducer $536_i$ of transducer array 535.

Ultrasonic ranging module 548, if implemented with Polaroid Model No. SN28827, is an active time-of-flight device developed for automatic camera focusing, and determines the range to target by measuring elapsed time between the transmission of a "chirp" of pulses and the detected echo.

To simplify the circuitry involved, all timing and time-to-distance conversions are performed in software by processor 40. Three control lines are involved in the interface of the ultrasonic circuit board 548 to processor 40. Referring to FIG. 6, the first of these, referred to as VSW, initiates operation when brought high to +5 volts. A second line labelled XLOG signals the start of pulse transmission, while the line labelled MFLOG indicates detection of the first echo. Processor 40 must therefore send VSW high, monitor the state of XLOG and commence timing when transmission begins (approximately 5 milliseconds later), and then poll MFLOG until an echo is detected or sufficient time elapses to indicate there is no echo.

Four input/output (I/O) lines, 537, 538, 540, and 542, from processor 40 handle the switching function of ultrasonic transducers $536_i$ by activating analog switch 544, which may be a 4067 analog switch. The binary number placed on I/O lines 537, 538, 540, and 542 by processor 40 determines which channel is selected by switch 544; all other channels assume a high impedance state. Referring to FIG. 7, each of the relays 576 and its associated driver transistor 572 (illustrated in FIG. 6 as Detail A) is substantially identical and illustrated in detail in FIG. 7. Relay driver transistor 572 is biased into conduction by current limiting resistor 543 via the active channel of analog switch 544 in such a fashion such that only one transistor 572 per switch 544 is conducting at any given time, as determined by the binary number present at the outputs of I/O lines 537, 538, 540, and 542. Conducting transistor 572 sinks current through its associated relay coil of relay 576, closing the contacts of relay 576. This action causes one and only one of the transducers 536$_i$ in array 535 to be connected to and hence driven by the ultrasonic ranging module 548, when ranging module 548 is activated by processor 40 as described below.

I/O lines 561, 571, and 555, shown in FIG. 6, carry the logic inputs to processor 40 from the ranging module 548 for XLOG and MFLOG, and from processor 40 to the ranging module 548 for VSW. Non-inverting buffer 568 is used to trigger switching transistor 562 upon command from processor 40 to initiate the firing sequence of ranging module 548. Resistors 558 and 560 along with transistor 561 form an inverting buffer for the XLOG signal which indicates the actual start of pulse transmission. Resistors 552 and 554 along with transistor 550 form an inverting buffer for the MFLOG signal which indicates detection of the echo. An I/O line from processor 40 activates switch 533, shown in FIG. 5, to power down the circuitry when not in use to save battery power.

A second parallel port on processor 40 receives commands from local processor 26 which direct processor 40 to power-up multiplexer 534, and then sequentially activate transducers 536$_i$. Commands may be in the form of an eight-bit binary number represented in hexadecimal format, where the upper nibble represents the starting ID and the lower nibble the ending ID for the sequence. For example, the command $15 can be used to activate and take ranges using sensors #1 through #5, sequentially. Each time through the loop, upon completion of the sequence, the stored ranges are transmitted up the hierarchy to the local processor 26 over an RS-232 serial link, with appropriate handshaking. The sequence is repeated in similar fashion until such time as local processor 26 sends a new command down, or directs processor 40 to power down multiplexer 534 with the special command $FF.

Figure 10:
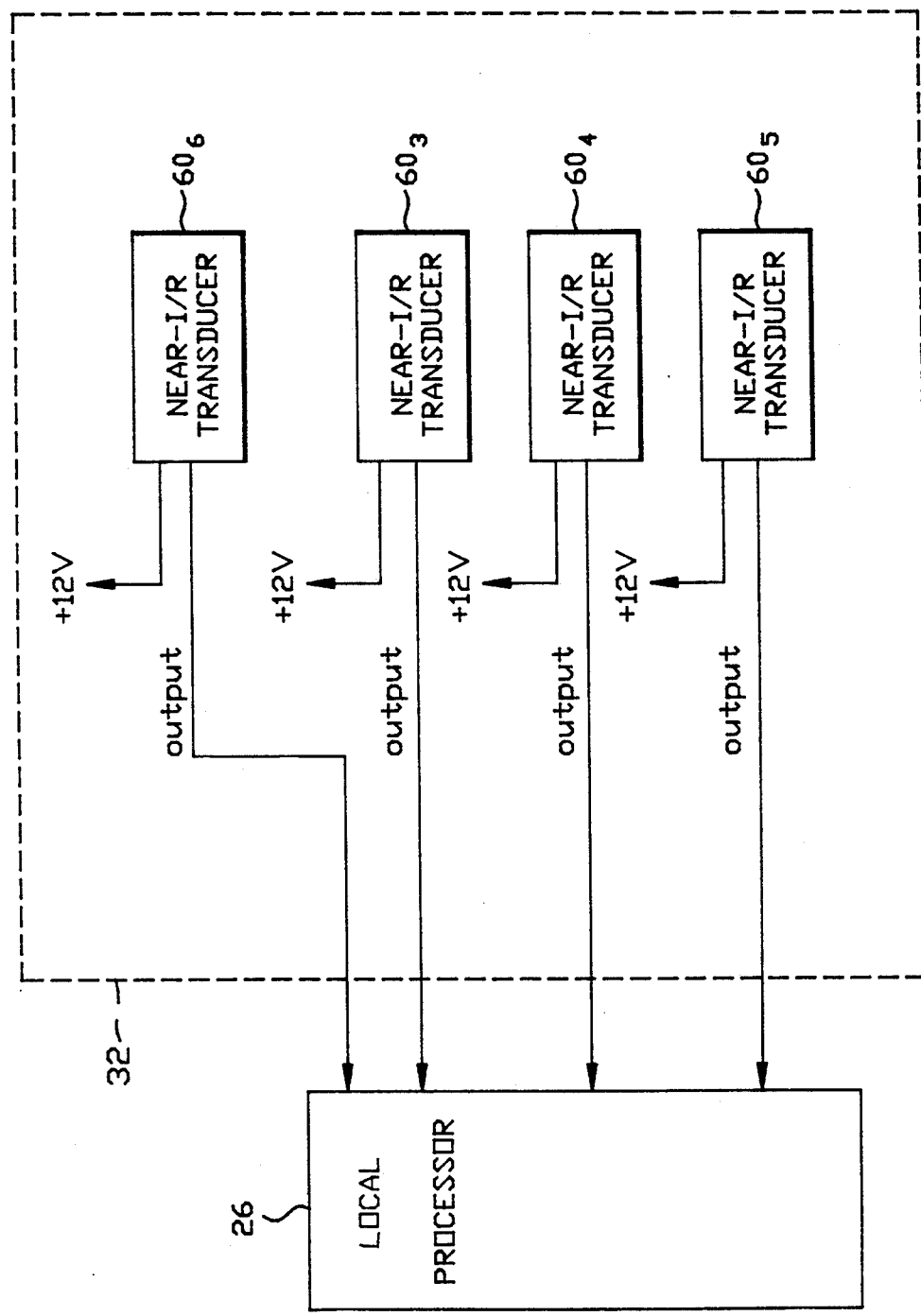
FIG. 10 is a block diagram of the infrared detector subsystem of the present invention.

The software implemented in processor 40 may, by way of example, be structured as shown in FIGS. 10 and 11. When enabled by the local processor 26, processor 40 does a power-on reset, initializes all ports and registers, and then waits for a command. When a command is latched into the I/O port of processor 40, as shown in FIG. 5, a flag is set automatically that alerts processor 40, which then reads the command and determines the starting and ending identities of the transducers 536$_i$ to be sequentially activated. The interface circuitry, shown in FIG. 6, and multiplexer 534 then are powered up, via switch 533 (FIG. 6) and the Y Register of processor 40 is set to the value of the first of transducers 536$_i$ to be fired.

Figure 8:
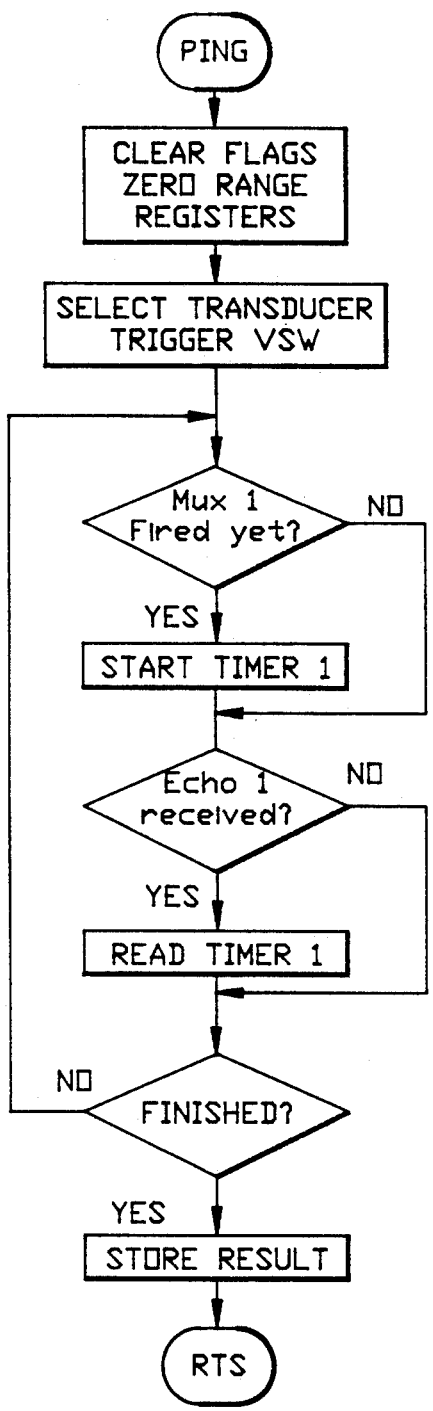
FIGS. 8 and 9 are flow charts of subroutines that direct the operation of the sonar subsystem.
Figure 9:
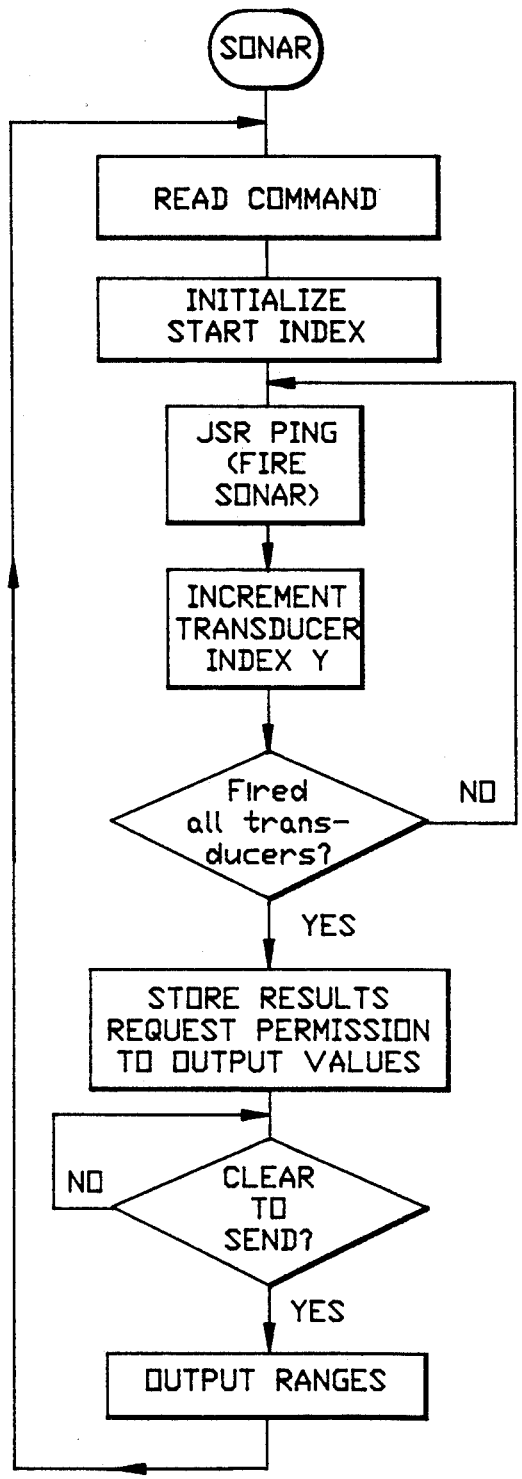

Referring to FIGS. 6 and 8, and continuing the example, Subroutine PING is called, which enables the particular channel of analog switch 544 dictated by the contents of the Y Register. The VSW control line 571 is sent high, which initiates operation of the ranging module 548 with the selected transducer. The software then watches the XLOG output 561 for indication of pulse transmission, before initiating the timing sequence. The contents of the timing counter, representing elapsed time, can be used to calculate range to the target. If this value ever exceeds the maximum specified range of the subsystem, the software will exit the loop, otherwise the counter runs until MFLOG input 555 is observed to go high, indicating echo detection. Upon exit from the timing loop, the range value for that particular transducer is saved in indexed storage, and Subroutine PING returns to the program "SONAR", depicted in FIG. 9.

The Y Register is then incremented to enable the next ranging module in the sequence, and Subroutine PING is called again as before. SONAR runs continuously in a loop whenever sonar subsystem 38 is enabled, incrementing the index "Y" and sequentially firing transducers 536$_i$, one at a time until the Y Register equals the value of the ending index, signifying that all transducers 536$_i$ in the sequence specified by the local processor 26 have been activated individually. Processor 40 then requests permission from the local processor 26 to transmit all the stored range values via the RS-232 serial link 533. When acknowledged, the ranges are sequentially dumped out the serial interface and placed by the local processor 26 in Page Zero indexed storage. Upon completion, processor 40 checks to see if a new command has been sent down altering the ranging sequence, and then repeats the process using the appropriate starting and ending indexes. Thus the software runs continuously in a repetitive fashion, sequentially activating the specified ranging modules, converting elapsed time to distance, storing the individual results, and then finally transmitting all range data at once to the local processor 26, which is thus freed from all associated overhead.

NEAR-INFRARED PROXIMITY SUBSYSTEM

Referring to FIG. 10, near-infrared proximity sensor subsystem 32 is shown to include diffuse-mode near-infrared proximity sensors 60$_6$, 60$_3$, 60$_4$, and 60$_5$. Sensor 60$_6$ is mounted in rotatable head 62 of vehicle 16. Sensors 60$_3$, 60$_4$, and 60$_5$ are mounted towards the base of propulsion module 28 so that they scan in a horizontal arc pattern of approximately 60 degrees centered about the front of propulsion module 28, as illustrated in FIG. 3. The range of each sensor is set to detect reflected infrared energy from a distance which may be about 26 inches, by adjusting potentiometers in each sensor 60$_i$. Sensors 60$_i$ may be any one of several types of near-infrared proximity sensors which are commercially available. One particular type of near-infrared sensor suitable for employment in the present invention is Valu-Beam SM912D, manufactured by Banner Engineering Corp., Minneapolis, Minn. The outputs of sensors 60$_i$ are normally "high", but go to a logic "low" when reflected near-infrared energy is detected. These outputs are provided to local processor 26 which decodes the data provided by sensors 60$_i$ to ascertain the presence of any obstacles that would impede the motion of vehicle 16.

OPERATION OF THE INVENTION

In the teleoperated mode of the preferred embodiment, high level drive commands from the human operator are entered via numeric keypad 15 (FIG. 2) of input device 14 into host computer 12 and are received by local processor 26, thus establishing the commanded heading and velocity of remote vehicle 16.

Referring now to FIG. 2, by way of example, the center key ('5') of numeric keypad 15 is the "Halt" key, which immediately stops any vehicle motion. The "Up Arrow" ('8') key is used to request forward motion; each time the ('8') key is depressed, the commanded forward speed is incremented, up to a maximum value.

The "Down Arrow" ('2') key is used to request reverse motion if vehicle 16 is stopped, or to decrement the forward speed value if moving forward. Similarly, pressing the "Up Arrow" ('8') key will decrement the commanded speed if the vehicle is moving backward. The "Left Arrow" ('4') key will cause the vehicle to rotate in place to the left if stopped, just as the Right Arrow ('6') key will cause in-place rotation to the right.

If the vehicle is moving forward (or reverse), however, the left ('4') and right ('6') arrow keys superimpose a turn offset onto the drive command. As previously discussed, propulsion module 28 employs differential steering. In the preferred embodiment, 15 possible speed commands are available for both the left and right drive motors, although it is to be understood that the scope of the invention includes other numbers of speed commands. Speed commands are of the form of a single hexadecimal byte, with the upper nibble specifying velocity for the left motor, and the lower nibble specifying that for the right. For a baseline speed command of $55 (both motors running at speed 5), a single stroke of the "Left Arrow" ('4') key would result in a commanded velocity of $46 (left motor speed 4, right motor speed 6). Pressing the key again would result in a command of "$37", for a sharper turn.

Local processor 26 evaluates the data provided by near-infrared proximity subsystem 32 and processor 40 of sonar subsystem 38 to ascertain the surrounding environment, and in conjunction with the ordered commands entered via manual input device 14, determines the actual direction of travel of vehicle 16, as well as its maximum safe speed, which is not to exceed the ordered speed.

The maximum safe speed is derived from the minimum range returned by sonar subsystem 38 in the direction of intended motion, using the center three transducers $536_3$, $536_4$, and $536_5$ in accordance with the following rules:

1) Any range reading (from these three transducers) which is less than a specified minimum threshold (three feet in the preferred embodiment) is treated as the minimum range, regardless of vehicle direction.
2) If the vehicle is going straight, the returned range from the center transducer is used as the minimum range if no transducers fall below the above minimum threshold.
3) If the vehicle is turning to the right, the lesser value of the returned ranges from the center and right transducers is used as the minimum range.
4) If the vehicle is turning to the left, the lesser value of the returned ranges from the center and left transducers is used as the minimum range.

In this way the detection zone is shaped to conform to the area of interest, and the maximum safe speed can be calculated based on the perceived congestion within the area of intended transit, simply by scaling the determined minimum range value. The maximum safe speed is therefore linearly proportional to the unobstructed ultrasonic range value returned in the direction of vehicle motion.

The software for reflexive teleoperation is set up as a loop which calls the governing routine (discussed further herein) to establish the maximum safe speed, and then looks for potential obstructions, as discussed in greater detail further herein. Each time the governing loop is called, the appropriate sonar readings are analyzed to generate the maximum safe speed, and an instruction imparting this speed to vehicle 16 is provided by processor 26 to processor 30 in accordance with the following rules:

1) If the calculated maximum safe speed is less than or equal to the commanded speed (from the operator), the maximum safe speed is ordered (passed to processor 30).
2) If the maximum safe speed is greater than the commanded speed, then the commanded speed is ordered.
3) If the current speed is greater than the speed to be ordered, then the new (slower) speed is ordered immediately.
4) If the current speed is less than the speed to be ordered, then the current speed is incremented.
5) If the current speed equals the speed to be ordered, then no action takes place.

Rules 1 and 2 ensure that the speed of vehicle 16 does not exceed that requested by the operator, nor is it allowed to be faster than the deemed safe speed for current conditions. Rules 3, 4 and 5 cause the processor 30 to immediately direct vehicle 16 to slow down to an ordered slower speed, but then to incrementally and successively ramp up to an ordered faster speed, as conditions allow. Speed governing can be disabled by the human operator if so desired by pressing the 'E' ("Emergency Override") key (not shown) on keyboard 15, whereupon the vehicle baseline velocity is as commanded, with no regard for surrounding obstructions.

Figure 23:
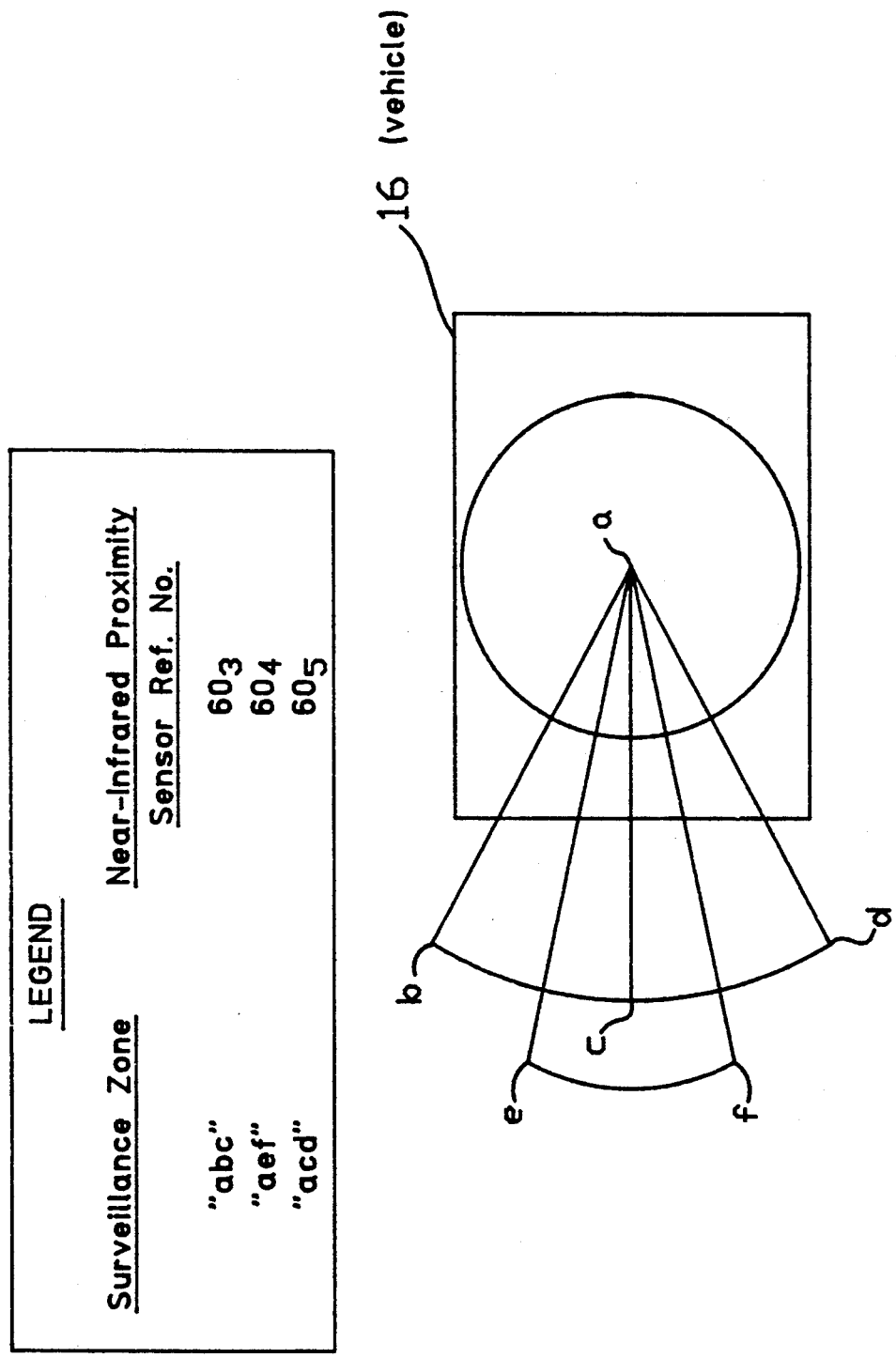
FIG. 23 illustrates the ultrasonic and infrared detection zones of the vehicle of the present invention.

Actual direction of travel is based on the commanded rate of turn modified as appropriate by data provided by both the ultrasonic transducers $536_i$ and near-infrared proximity sensors $60_i$. New infrared proximity sensors $60_3$, $60_4$, and $60_5$ detect near-infrared energy from near-infrared surveillance zones "abc", "aef", and "acd", respectively, in front of vehicle 16, as shown in FIG. 23. The outputs of transducers $536_i$ and near-infrared sensors $60_i$ are analyzed by processor 26 to identify which of the following cases applies:

a) No Obstruction
b) Obstruction Left
c) Obstruction Right
d) Obstruction Center
e) Blockage In case (a) above, the commanded rate of turn is unmodified, and vehicle 16 moves in direct response to the operator's instructions received by manual input 14. In case (b), processor 26 alters the drive command provided by the human operator through host computer 12 to local processor 26 so as to cause vehicle 16 to turn right, away from the obstruction. Similarly, in case (c), vehicle 16 would veer to the left. Note that cases (b) or (c) can occur in conjunction with case (d), whereupon the offset correction is increased, so as to provide a faster evasive rate of turn.

Case (d) by itself represents a scenario where an obstruction appears directly in front of vehicle 16, but is not yet detected by either of the side near-infrared proximity sensors $60_3$ or $60_5$, or by ultrasonic transducers $536_3$ or $536_5$. This situation is encouraged by the fact that center near-infrared sensor $60_4$ is adjusted to have a maximum detection range of 32 inches, whereas the side-looking near-infrared sensors $60_3$ and $60_5$ are calibrated for 26 inches to encourage case (d), above. The manner in which the present invention deals with the situation presented by case (d) represents one of the key features of the present invention.

The obstacle avoidance maneuver for situation (d) involves having vehicle 16 turn one way or the other until a clear area for transit appears. The desired direction of turn is determined in advance by the operator, using the '7' and '9' keys of numeric keypad 15 to specify 'left' and 'right', respectively. (Pressing either key will activate the "reflexive mode", which can be deactivated by pressing the '0' key.) In this way, the operator pre-selects the direction to turn in the event the path becomes blocked by an obstruction directly ahead.

As vehicle 16 begins to execute this turn in response to case (d), the inputs to transducers $536_3$ and $536_4$ will change accordingly, in response to some combination of case (d) in conjunction with either case (b) or (c), depending on the direction of turn. This new situation then evokes a continuing turn in the same direction as previously discussed. As this avoidance maneuver continues, the center transducer $536_3$ should eventually clear, and the rate of turn will be decreased, until such time as the side transducers $536_3$ or $536_4$ clear, whereupon vehicle 16 resumes its commanded travel.

Figure 24:
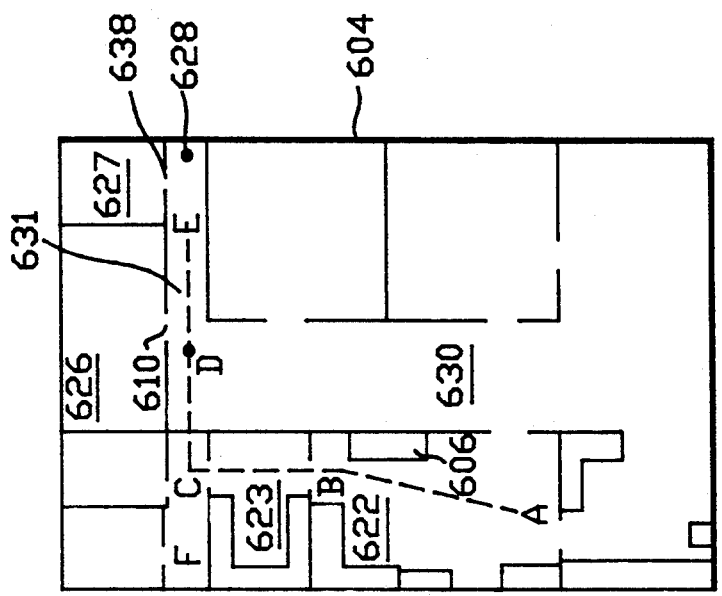
FIG. 24 depicts a typical operating environment of the present invention.

An example of reflexive operation of vehicle 16 is illustrated with respect to FIG. 24 which represents a plan view of a typical operating environment, such as building 604, in which the present invention may be operated. In this example, a pre-selected right turn ('9') entered into keypad 15 anywhere after point A on path segment ABC causes vehicle 16 to turn right at point C (case d) after exiting Room 623 and entering hallway 631, after which vehicle 16 proceeds to point D. Note, however, the slight course correction to the left at point B (case c), due to the presence of object 606, such as a cabinet, to the right of vehicle 16 as it travels from Room 622 to Room 623. Similarly, a pre-selected left turn anywhere along ABC will cause the vehicle to go to destination F upon encountering the case (d) blockage at C. In the event of a right turn at C, operator intervention at point D in the form of a right turn command ["Right Arrow" ('6') key] will cause vehicle 16 to turn and enter the open bay area 630; otherwise the vehicle would continue to point E.

Case (e) is any combination which includes cases (b) and (c) together, which corresponds to a situation where the path of vehicle 16 is blocked with some degree of symmetry relative to the intended path, and where veering in the direction of free space is not possible. In other words, the path is sufficiently blocked so that vehicle 16 must turn in place until a clear exit path appears. The direction in which to pivot is determined by the pre-specified turn preference. For instance, as vehicle 16 travels from point D past point E, shown in FIG. 24, it comes to the end 628 of hallway 631, which ultimately will evoke a 'case (e)' response if the doorway 638 to Room 627 may be shut. Vehicle 16 then rotates in place (to the right, unless the pre-selected direction was changed by the operator somewhere along path segment CDE) until it is facing the open hallway looking back towards point D. Forward motion is then resumed along path segment ED.

The preceding discussion relates for the most part to the scenario where vehicle 16 is moving towards some desired opening, such as a doorway, which may be in the vicinity of forward travel. However, another situation that arises quite frequently in normal operations involves a doorway located off to the side of (yet in close proximity to) the path of travel. A good illustration of this situation is seen in the case where vehicle 16 is traveling down a narrow hallway, and it is desired to direct vehicle 16 through a side door opening into that hallway. An example of this type of situation is described with reference to FIG. 24 for the case where vehicle 16 is commanded to make a left turn into Room 626 while executing path CDE. The problem becomes one of perspective, in that the forward-looking sonars $536_i$ and near-infrared proximity sensors $60_i$ are not able to detect the doorway 610 to Room 626. Doorway 610 will pass from the field-of-view of video camera 42 before vehicle 16 has arrived at the proper point to initiate a turn. Therefore, in order to execute this maneuver without localized assistance from the onboard sensors, the operator must rely upon prior similar experience with this operation, or pan head 62 accordingly so that video camera 42 scans the proper region to provide sufficient visual feedback to the operator. In some cases, doorway 610 may never appear in the video scene, due to the angle or route of approach.

This problem is overcome through an additional capability referred to as "SEEK MODE" that is implemented in local processor 26, in conjunction with sonar subsystem 38 and near-infrared proximity subsystem 32. The problem is subdivided into the following steps:

1) Activating "SEEK MODE": Vehicle 16 must be instructed to look for an opening on the left or right side of vehicle 16.
2) Automatically providing the operator with visual feedback provided by video camera 42 to video monitor 50.
3) Locating the actual opening.
4) Initiating the turn of vehicle 16 into the opening at the proper time.
5) Negotiating vehicle 16 through the opening.
6) Terminating implementation of the "SEEK MODE" in order to resume straight line transit of vehicle 16.

The first task is accomplished through use of the '1' and '3' keys in numeric keypad 14 at the operator control station. Depressing the '1' key initiates a seek action on the left side of vehicle 16. Depressing the '3' initiates seek action on the right side of vehicle 16. Immediately upon receipt of the subsequently generated "seek" command, local processor 26 provides a command to head pan axis controller 52 which causes rotatable head 62 on vehicle 16 to turn 80 degrees from straight ahead (the "0" degree reference position) in the direction requested. At this time, local processor 26 also activates sensor $60_6$ of near-infrared proximity subsystem 32 which is disposed to indicate the presence of any reflective targets within five feet. Calibration of near-infrared proximity sensor $60_6$ is accomplished by adjusting the built in gain potentiometer. Video camera 42 (Refer to FIGS. 1 and 3) is now positioned so as to provide the operator with a view of any upcoming opening, such as for example, doorway 627 shown in FIG. 24, as vehicle 16 continues moving along its original course, thus satisfying the second step, described above.

Identification of the opening is accomplished by local processor 26 which monitors the output of near-infrared proximity sensor $60_6$. Of course, the outputs of sensor $60_6$ may be filtered to account for minor output deviations due to specular reflection in accordance with techniques well known by those skilled in this art. Near-infrared proximity sensor $60_i$ indicates any target (wall) present within two seconds from the time rotatable head 62 is rotated 80 degrees from the "0" degree reference position. A target must remain valid for at least one more second. Local processor 26 then looks for a 'target-to-no-target' transition, and the 'no-target' condition must persist for one second before initiation of turning vehicle 16. If any of these conditions are violated, or if a new command is sent down by the operator, the processor 26 kicks out of "SEEK MODE" and returns to the reflexive mode, centering rotatable head 62 in the process.

Once a doorway has been found, SEEK MODE initiates a turn in the appropriate direction so as to align the intended path of travel of vehicle 16 with the identified opening. The turn continues until forward-looking ultrasonic transducers $536_i$ or near-infrared proximity sensors $60_i$ detect a target, or until vehicle 16 has turned 90 degrees from its original heading. At this point, "SEEK MODE" is exited, and the software returns to the calling program, "WANDER". Rotatable head 62 returns video camera 42 to the center reference position, and reflexive control automatically takes over, guiding vehicle 16 through the doorway. For this reason, the left and right "SEEK MODE" commands automatically set the corresponding desired turn direction for reflexive mode, so as to ensure a smooth transition.

Commands from local processor 26 are of the following format: "0WXX", where the leading '0' indicates the command is intended for local processor 26, and the 'W' instructs the COMMAND PARSER software routine that this command pertains to reflexive teleoperation. The single parameter 'XX' then is interpreted as shown below:

| Key | XX | Interpretation |
| --- | --- | --- |
| '0' | 00 | reflexive and seek modes disabled |
| '7' | 01 | reflexive enabled, preselected left turn |
| '9' | 02 | reflexive enabled, preselected right turn |
| '1' | 11 | seek enabled, left side |
| '3' | 22 | seek enabled, right side |

When "SEEK MODE" is successfully terminated, the upper nibble of the parameter 'XX' is cleared, leaving the system in the reflexive mode with a predisposition to turn in the previously specified "seek" direction.

SOFTWARE

The software implemented in the present invention is programmed, by way of example, in 6502 assembly language and is presented in Appendix I, herein. Significant portions of this software that assist in understanding the operation of RTCS 10 are described below.

PARSER [FIG. 25]

The software which decodes commands from host computer 26 and subsequently enables operation of each subsystem of vehicle 16 is presented as subroutine "PARSER" and is implemented in processor 26 and illustrated and described with respect to FIG. 14. PARSER reads in commands provided by host computer 12 to local processor 26. Examples of the types of commands recognized by PARSER are an "execute" command, a "move" command, a "reflexive" command, and a "head" positioning command.

The PARSER subroutine is the command interpreter (i.e., the command parser). Each command that comes in is preceded by a single digit that indicates the destination of the command. "Execute" commands turn on or off various binary functions. A "reflexive" command causes vehicle 16 to change state from being manually controlled through keyboard 15 to being reflexively controlled, and passes appropriate parameters to other subroutines. A "head positioning" command directs pan head axis controller 52 so as to properly orient video camera 62.

WANDER [FIG. 13]

Figure 13:
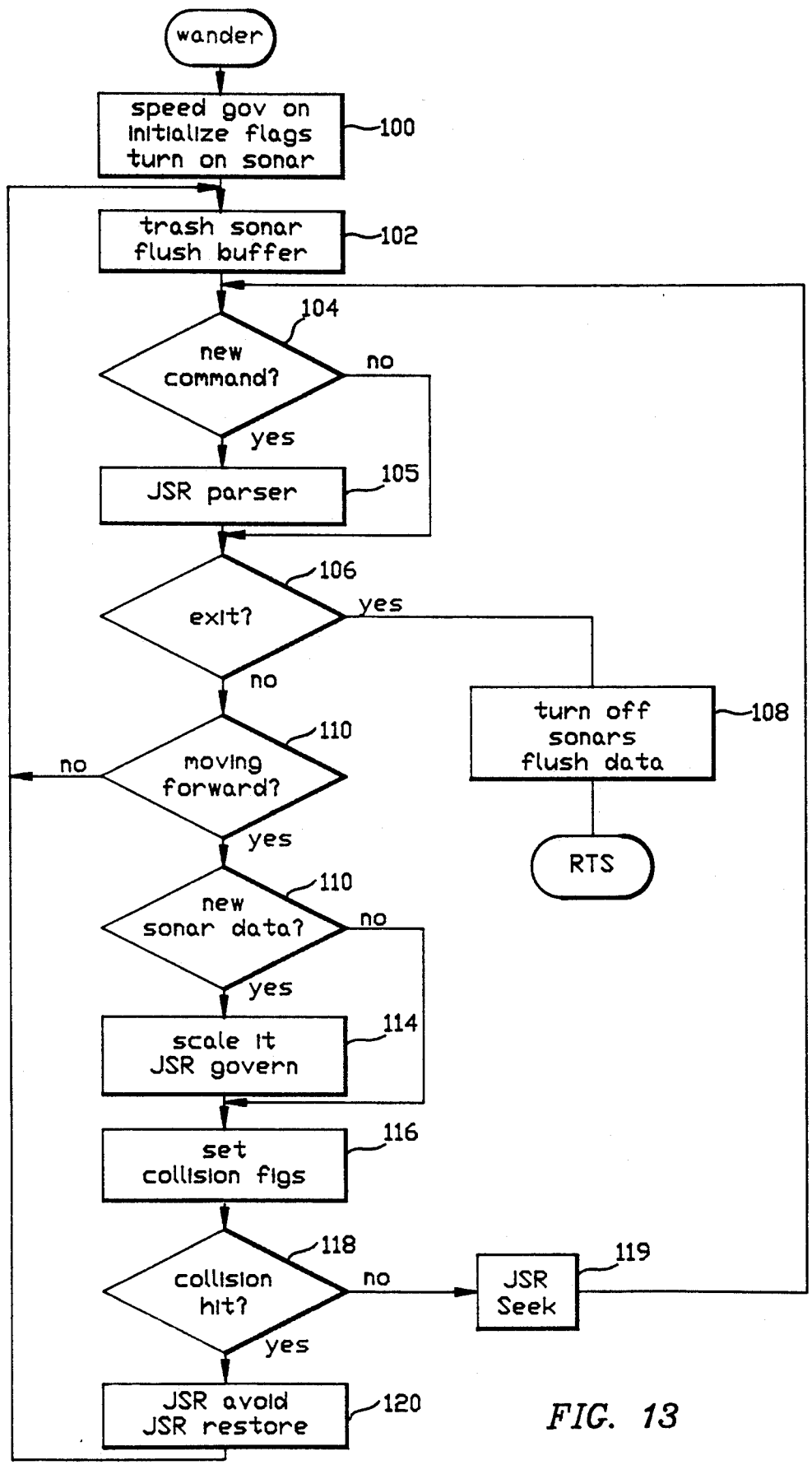
FIG. 13 is a flow chart of the software program "WANDER".

The main software loop which is the heart of the reflexive capability of the present invention is a subroutine referred to as "WANDER," described with reference to FIG. 13, and implemented in processor 26. At step 100 WANDER activates a speed governor (implemented in software), enables sonar subsystem 38 and initializes all flags. Proceeding to step 102, WANDER flushes the storage buffer of processor 26 of all previous data provided by sonar subsystem 38. A decision is made at step 104 to determine whether WANDER has received a new command from host computer 12. If no new command has been provided, WANDER proceeds to step 106 where it is determined whether WANDER should be exited. If the answer is "YES", sonar data is flushed from the buffer at 108, and sonar subsystem 38 is disabled. If the decision at 106 is "NO" (not to exit WANDER), then it is determined at step 110 whether vehicle 16 is moving forward. If the decision at step 110 is "NO", then WANDER returns to step 102 and continues as previously described. If the determination at step 110 is "YES", then WANDER proceeds to step 112 where it is determined whether new data from sonar subsystem 38 has been provided. If the answer is "YES", then the new sonar data is scaled at step 114. If the determination at step 112 is NO, then WANDER proceeds directly to step 116 where subroutines referred to as "SON.FLG" and "PRX.FLG.", each described further herein, are called. These subroutine set certain flags, depending on the outcome of an analysis of the latest data provided by near-infrared proximity subsystem 32 and sonar subsystem 38.

After these subroutines return their values, WANDER proceeds to step 118 where a determination is made as to whether any of the flags indicate vehicle 16 is on a collision course. If the determination at step 118 is NO, WANDER proceeds to step 119 which calls a subroutine referred to as "SEEK" (explained further herein), and returns to step 104. If the determination in step 118 is "YES", then WANDER calls two subroutines: "AVOID", and "RESTORE", described further herein. After these subroutines return their values, WANDER proceeds back to step 102 and repeats itself as previously described.

If the determination at step 104 is "YES", WANDER proceeds to step 105 and calls "PARSER", which "parses" or interprets commands from host computer 12.

FLG.DCD [FIG. 14]

A subroutine entitled "FLG.DCD" (flag decode) is described with reference to FIG. 14. The purpose of this subroutine is to provide a binary number output indicating the relative position of any obstacles detected by near-infrared sensors $60_3$, $60_4$, or $60_5$, or by ultrasonic transducers $536_7$, $536_8$, $536_3$, $536_4$, or $536_5$. Subroutine "FLG.DCD" is entered at step 140 where a decision is made as to whether near-infrared sensors $60_3$, $60_4$, or $60_5$ or ultrasonic transducers $536_3$, $536_4$, or $536_5$ detect a potential obstruction. If that determination is NO, a determination is made at step 142 as to whether any of ultrasonic transducers $536_7$ or $536_8$ have detected reception of an ultrasonic echo from within a predetermined distance. If the determination at step 142 is "YES", then a determination is made at step 144 as to whether both ultrasonic transducers, $536_7$ and $536_8$ have detected an obstruction. If the determination at step 144 is "YES", then the second bit ("flag") of an eight-bit binary byte which is initialized to the value "00000000," is set to 1, whereupon "FLG.DCD" returns to the calling program. If the determination at step 144 is NO, a determination is made at step 146 as to whether ultrasonic transducer $536_7$ has detected reflected ultrasonic energy. If that determination is "YES", then the third bit of "flag" is set to 1 (flag=0000100). If the determination at step 146 is NO, then the first bit of "flag" is set of 1 (flag equals 00000001). "FLG.DCD" then returns to the calling program. If the determination at step 142 is NO, that is neither ultrasonic transducers $536_7$ or $536_8$ have detected an ultrasonic wave, then "FLG.DCD" returns to the calling program.

If the determination at step 140 is "YES", then a determination is made at step 160 to determine if each of ultrasonic transducers $536_3$, $536_4$, and $536_5$ or each of near-infrared sensors $60_3$, $60_4$, and $60_5$ detected a potential obstruction. If that determination is "YES", then the fifth bit of "flag" is set to 1 at step 162 (flag equals 00010000). "FLG.DCD" then returns to the calling program. If the determination at step 160 is NO, a determination is made at step 164 as to whether only center ultrasonic transducer $536_4$ or center near-infrared sensor $60_4$ detected the presence of the potential obstruction. If that determination is "YES", then a further determination is made at step 166 as to whether any of ultrasonic transducers $536_7$ or $536_8$, or near-infrared sensors $60_?$ or $60_?$ detected the potential obstruction. If the determination in step 166 is NO, FLG.DCD continues at step 145. If the determination at step 166 is "YES", the fourth bit of "flag" is set to 1 (flag equals 00001000) at step 158. The program then proceeds to step 144.

If the determination at step 164 is "NO", a determination is made at step 170 as to whether either of ultrasonic transducers $536_3$ or $536_5$, or either of near-infrared sensors $60_3$ or $60_5$ detected the potential obstruction. If that determination is "YES", "FLG.DCD" proceeds to step 145. If the determination at step 170 is "NO", a determination is made at step 170 as to whether the left ultrasonic transducer $536_3$ or left near-infrared sensor $60_3$ detected the potential obstruction. If the determination at step 172 is "NO", the first bit of "flag" is set to 1 (flag equals 00000001). If the determination at step 172 is "YES", the third bit of "flag" is set to 1 (flag equals 00000100). From either of step 174 or step 176, the program continues to step 178 where a determination is made as to whether the center ultrasonic transducer $536_4$ or center near-infrared sensor $60_4$ detected the object. If that determination is "NO", a further determination is made at step 180 as to whether either of ultrasonic transducers $536_7$ or $536_8$, or either of near-infrared sensor $60_?$ or $60_?$ detected the object. If the decision at step 180 is "NO", then "FLG.DCD" proceeds to the calling program. If the determination at step 180 is "YES", then at step 182 the fourth bit of "flag" is set to 1 (flag equals 00001000). If, however, a determination at step 178 is "YES", then the program proceeds to step 182. After step 182 "FLG.DCD" returns to the calling program.

GOVERN [FIG. 15]

Figure 15:
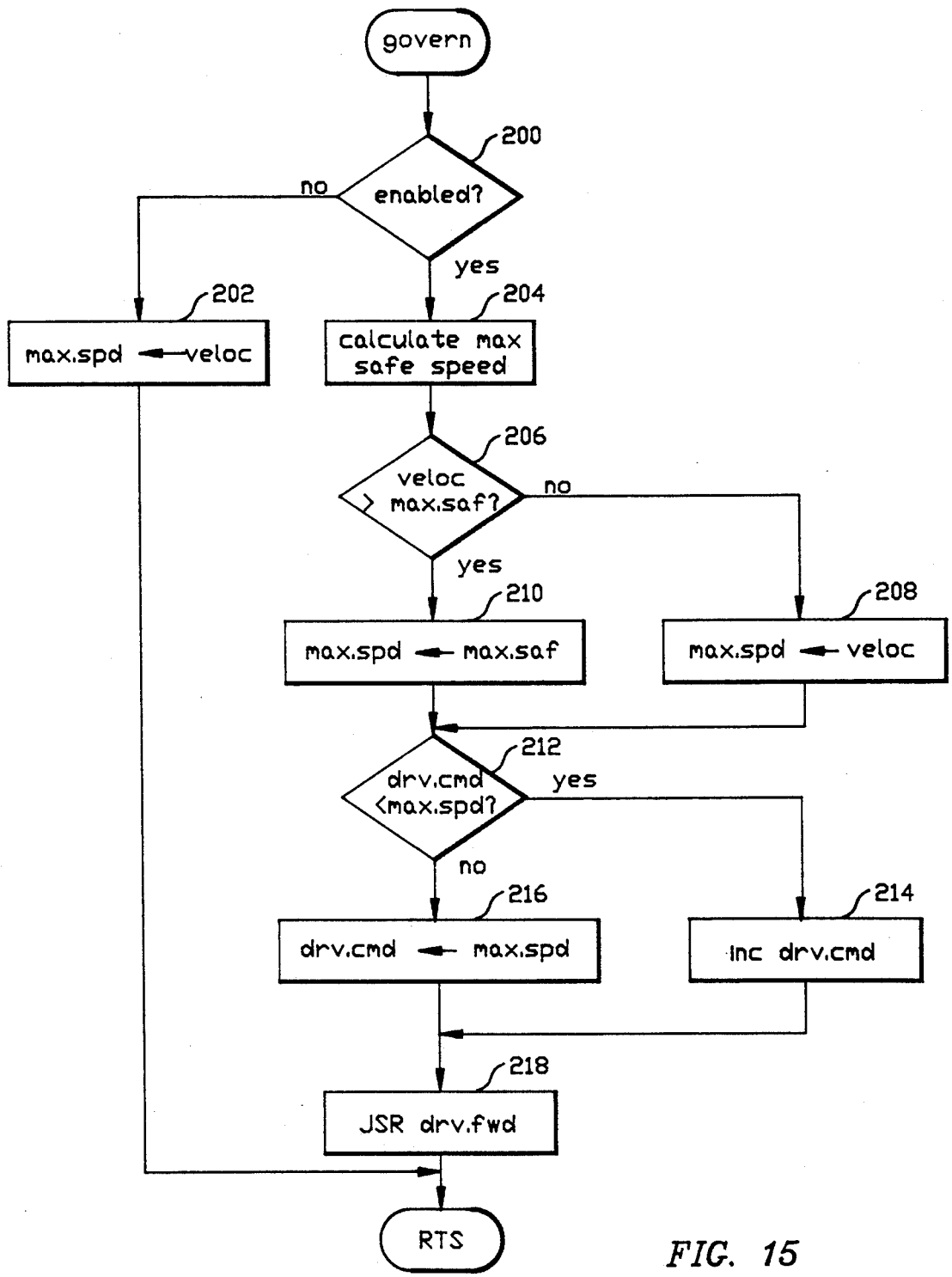
FIG. 15 is a flow chart of the software program "GOVERN".

The subroutine "GOVERN" establishes the maximum safe forward speed of propulsion module 28 based on the perceived congestion in the operating area, not to exceed the ordered speed requested by the operator. GOVERN is active only if there are no obstacles detected which necessitate an avoidance maneuver, and is described with reference to FIG. 15.

A decision is made at step 200 to determine whether the reflexive teleoperated control mode of the present invention is enabled. If that determination is NO, then at step 202, the maximum permitted speed of vehicle 16 is set equal to the speed requested by the human operator. "GOVERN" then returns to the calling program.

If the determination at step 200 is "YES", then the maximum safe speed of vehicle 16 is calculated at step 204 by scaling the sonar range data provided by sonar subsystem 38. At step 206 a determination is made as to whether the presently requested speed of vehicle 16, input through numeric keypad 15 by the human operator, exceeds the maximum safe speed calculated in step 204. If the determination at step 206 is NO, then the maximum speed of vehicle 16 is set equal to the requested speed at step 208. If, however, the determination at step 206 is "YES", then at step 210, the maximum speed of vehicle 16 is set equal to the maximum safe speed of vehicle 16 as calculated in step 204. From steps 210 or 208, "GOVERN" proceeds to step 212 where a determination is made as to whether the current actual speed of vehicle 16 is less than the maximum speed calculated at step 204. If the determination at step 212 is "YES", then the speed of vehicle 16 is incremented at step 214. If the determination at step 212 is NO, then at step 216, the drive command speed is set equal to the maximum speed value determined from step 208 or 210. From either of steps 216 or 214, "GOVERN" proceeds to step 218 which passes the final resulting speed value to drive controller 30. Afterwards, "GOVERN" returns to the calling program.

Figure 16A:
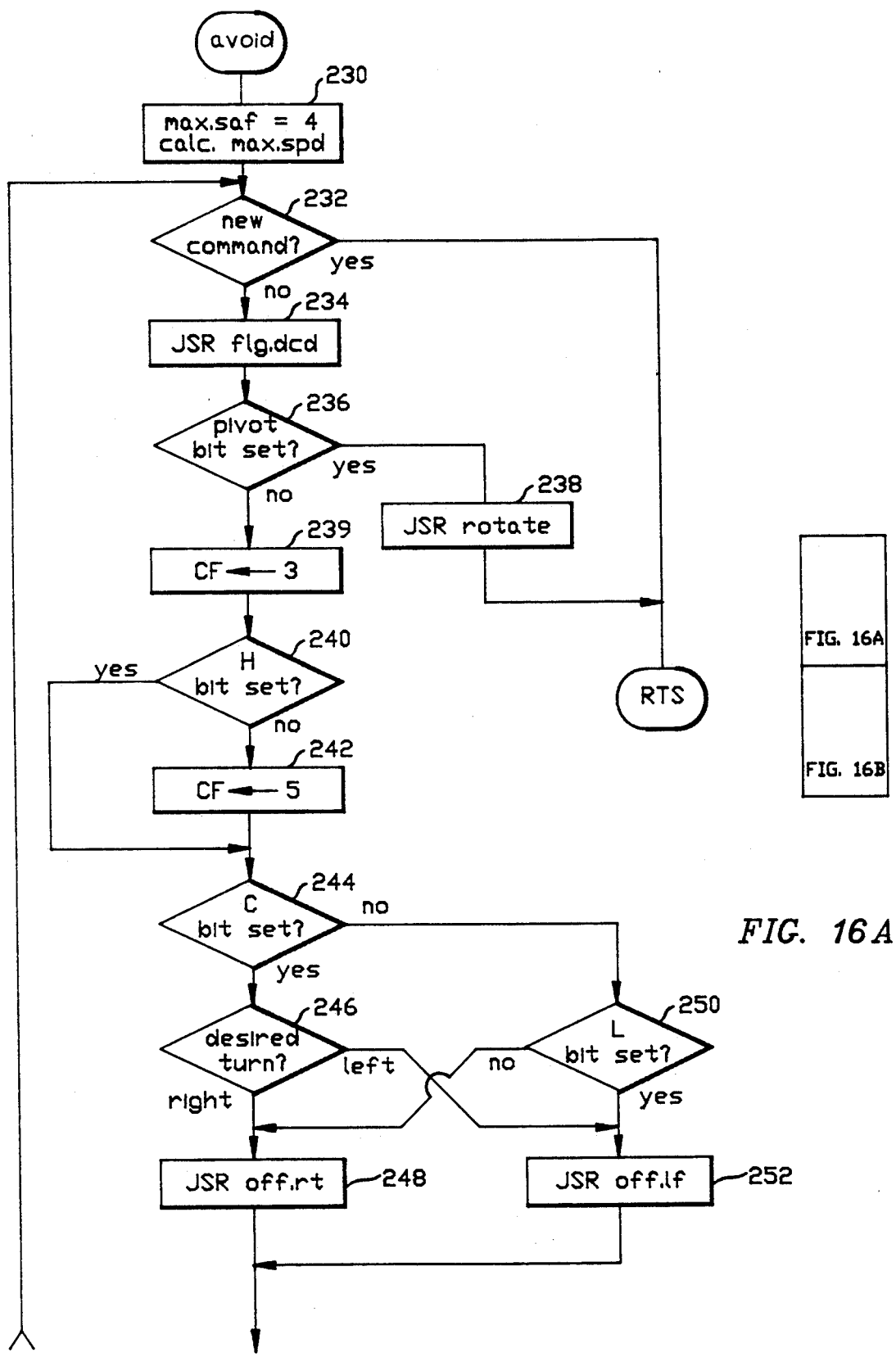
FIGS. 16A and 16B is a flow chart of the software program "AVOID".
Figure 16B:
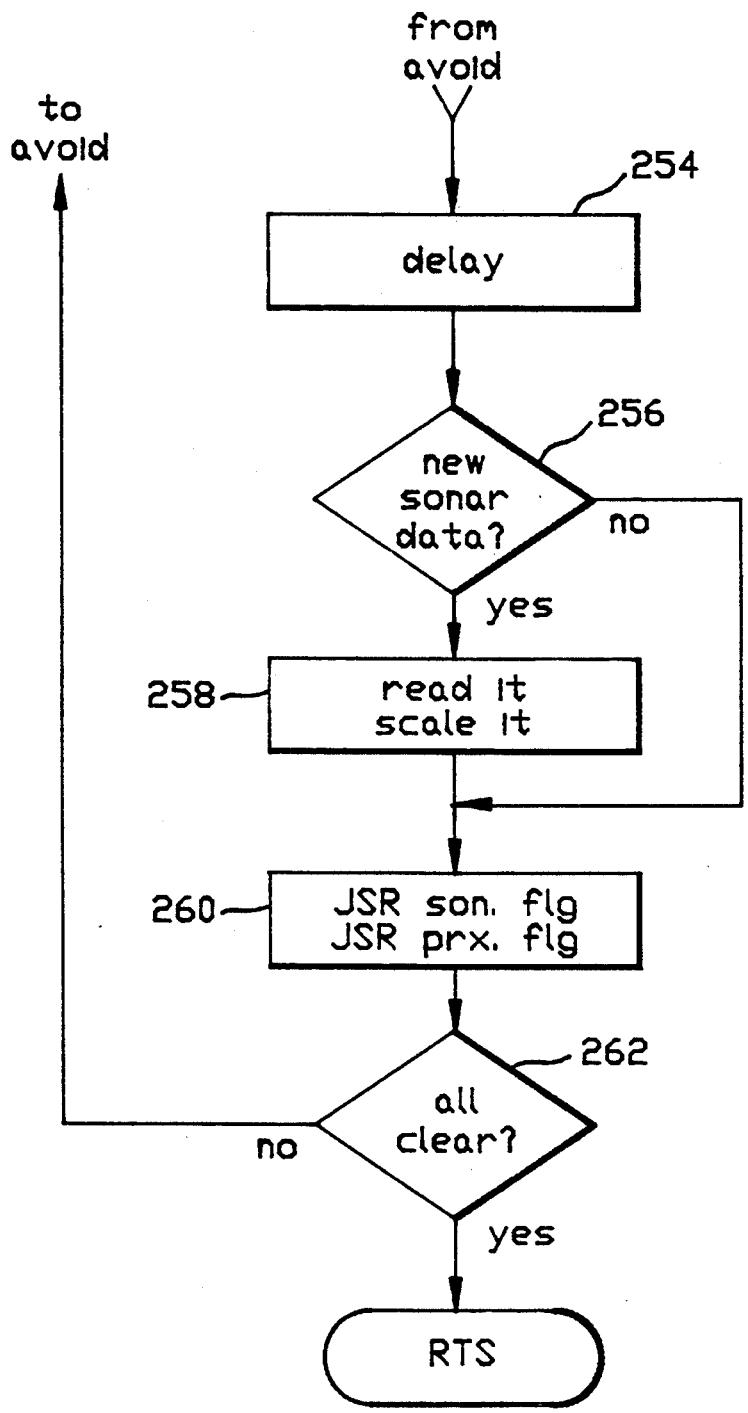

AVOID [FIGS. 16A and 16B]

The subroutine "AVOID" acts upon the flags set in the "response register" by subroutine "FLG.DCD" so as to order the appropriate avoidance maneuver. AVOID requests sensor updates each time it loops, and retains control until such time as no obstructions are detected. AVOID is described with reference to FIGS. 16A and 16B.

The maximum safe speed magnitude is predetermined to be a fixed scaler value of "4" whenever "AVOID" is active, and the corresponding maximum safe speed command is calculated at step 230. This may result from a straight-travel command of "$44", or a left turn ("$35"), or a right turn ("$53"), etc, where the commands are provided by local processor 26 to processor 30 of propulsion module 28. This routine calculates the correct command wherein the numerical digits comprising the command have an average "magnitude" of "4".

At step 232 a determination is made as to whether the human operator has provided a new command through keypad 15. If the determination at step 232 is "YES", then "AVOID" returns to the calling program. If the determination at step 232 is "NO", however, the subroutine "FLG.DCD", as previously described, is summoned at step 234. "AVOID" proceeds to step 236 where a decision is made as to whether the fifth bit of the variable "col.flg" (call flag) has been set to "1", indicating vehicle 16 is required to rotate. If that determination is "YES", the subroutine "ROTATE", described further herein, is summoned at step 238. From step 238 "AVOID" returns to the calling program.

If the determination at step 236 is NO, then a variable "CF" is set equal to "3" at step 238. "CF" specifies the magnitude of a correction factor that is selectively applied to the current drive command to introduce an offset command, resulting in a turn. The greater the value of "CF", the greater the offset command, corresponding to a sharper turn. At step 240 a determination is made as to whether a fourth bit (H) of the variable "flag" has been set to "1". If the determination at step 240 is "NO", then the value of variable CF is increased to "5" at step 242 in order to effect a sharper turn response. If, however, the determination at step 240 is "YES", then a determination is made at step 244 as to whether a second bit of the variable "flag" has been set equal to 1. If the determination at step 244 is "YES", then a decision is made at step 246 as to whether the human operator had previously requested vehicle 16 to turn left or right while executing an avoidance maneuver. If the determination at step 246 is to execute a right turn maneuver, then "AVOID" proceeds to step 248 where an offset is provided by processor 26 to the drive command processor 30, thereby initiating the turn to the right.

If the determination at step 244 is "NO", a determination is made at step 250 as to whether the third bit of the variable "flag" has been set equal to "1". If that determination is "NO", "AVOID" proceeds to step 248 where an offset is ordered to initiate a right turn. If the determination is "YES", "AVOID" proceeds to step 252 which provides a left turn instruction. From either of steps 242 or 252 "AVOID" proceeds to step 254 which causes a slight time delay to allow the drive controller processor 30 to read the new command. At step 256 a determination is made as to whether new sonar data has been received by ultrasonic transducers $536_{7-5}$. If the determination at step 256 is "YES", then that data is read and scaled at step 258. If the determination at 256 is NO, then "AVOID" proceeds to step 260 which calls subroutines "SON.FLG" and "PRX.FLG". At step 262 a determination is made as to whether or not a potential collision exists, or both ultrasonic transducers $536_7$ and near-infrared proximity sensor $60_7$ indicate a clear path. If the determination at step 262 is NO, then "AVOID" returns to step 232. If the determination at step 262 is "YES", however, "AVOID" returns to the calling program, having successfully avoided the obstacle.

RESTORE [FIG. 17]

Figure 17:
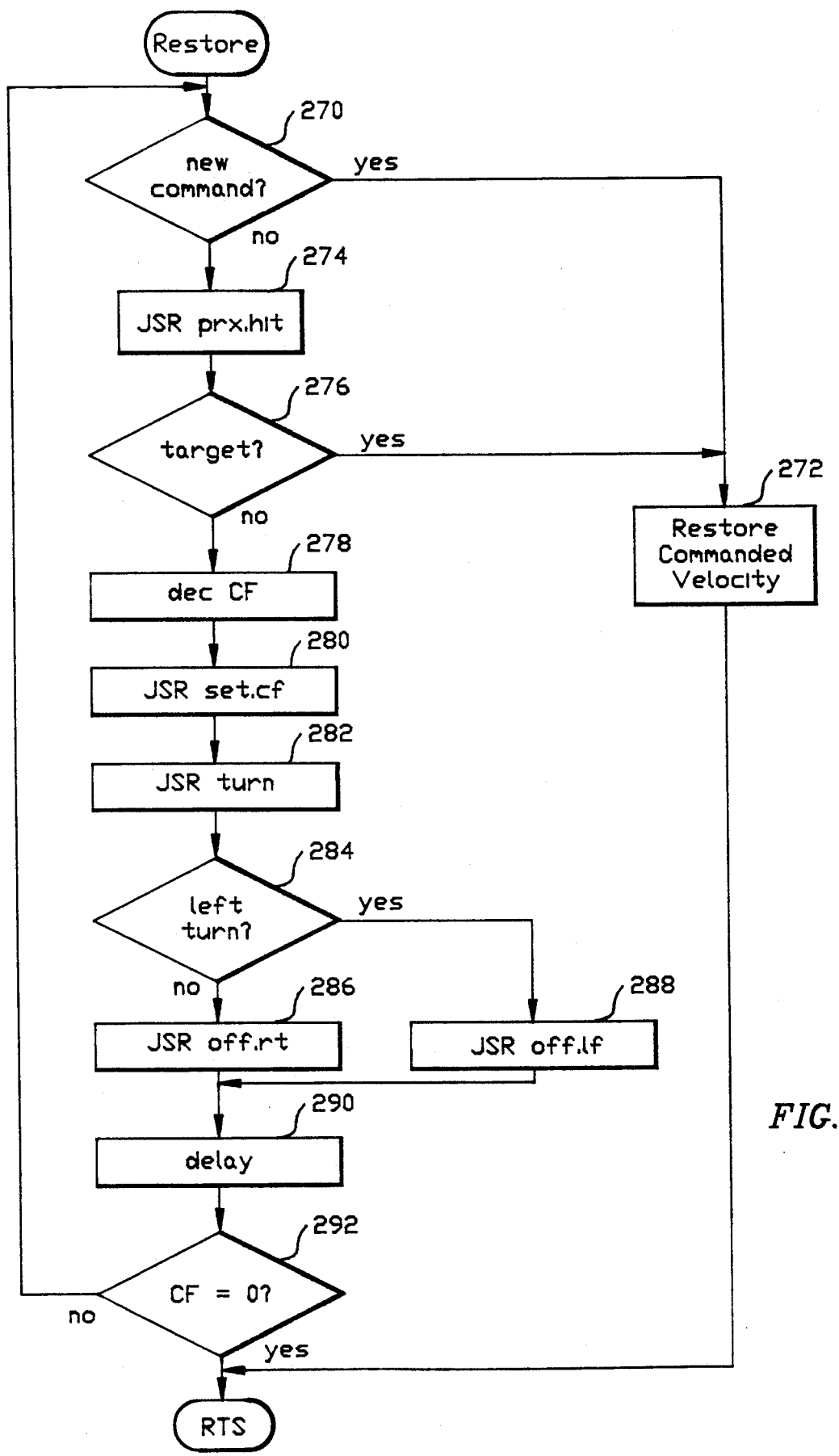
FIG. 17 is a flow chart of the software program "RESTORE".

Subroutine "RESTORE" is called after the subroutine "AVOID" relinquishes control to terminate the avoidance turn and restore straight line motion to propulsion module 28. RESTORE incrementally modifies the drive command each time through its internal loop, until the original command has been restored. Subroutine "RESTORE" is described with reference to FIG. 17.

At step 270 a determination is made as to whether a new command has been input through keypad 15. If that determination is "YES", "RESTORE" proceeds to step 272 and immediately restores the original speed commanded by the human operator by calling subroutine "DRV.FWD" with the value of "MAX.SAF". "RESTORE" then returns to the calling program. If the determination at step 270 is NO, the data provided by ultrasonic transducers $536_i$ and near-infrared proximity sensors $60_i$ are read at step 274 and a determination is made at step 276 at to whether the data indicates the presence of any potential obstacles. If that determination is "YES", "RESTORE" proceeds to step 272 and exits so that "AVOID" can be reactivated. If, however, the determination at step 276 is NO, then at step 278 the correction factor "CF" is decremented at step 280. At step 282 the direction of turn is recalled, and at step 284 a determination is made as to whether vehicle 16 is turning left. If the determination at step 284 is NO, then at step 286, the turn offset to the right is recalculated with a smaller value of "CF". If the determination at step 284 is "YES", then the turn offset to the left is recalculated with a smaller value of "CF" at step 288. From either of steps 286 or 288 "RESTORE" proceeds to step 290 which provides a time delay so that processor 30 has time to assimilate the new instruction to turn.

At step 292 a determination is made as to whether "CF" is equal to "0", which signifies the offset is zero, indicating vehicle 16 is traveling in accordance with its originally commanded rate of turn. If "CF" is not equal to "0", then "RESTORE" loops to step 270 to continue the process of decrementing the value of "CF". If the determination is that "CF" equals "0", then "RESTORE" returns to the calling program, with original motion having been restored to vehicle 16.

ROTATE FIG. 18]

Figure 18:
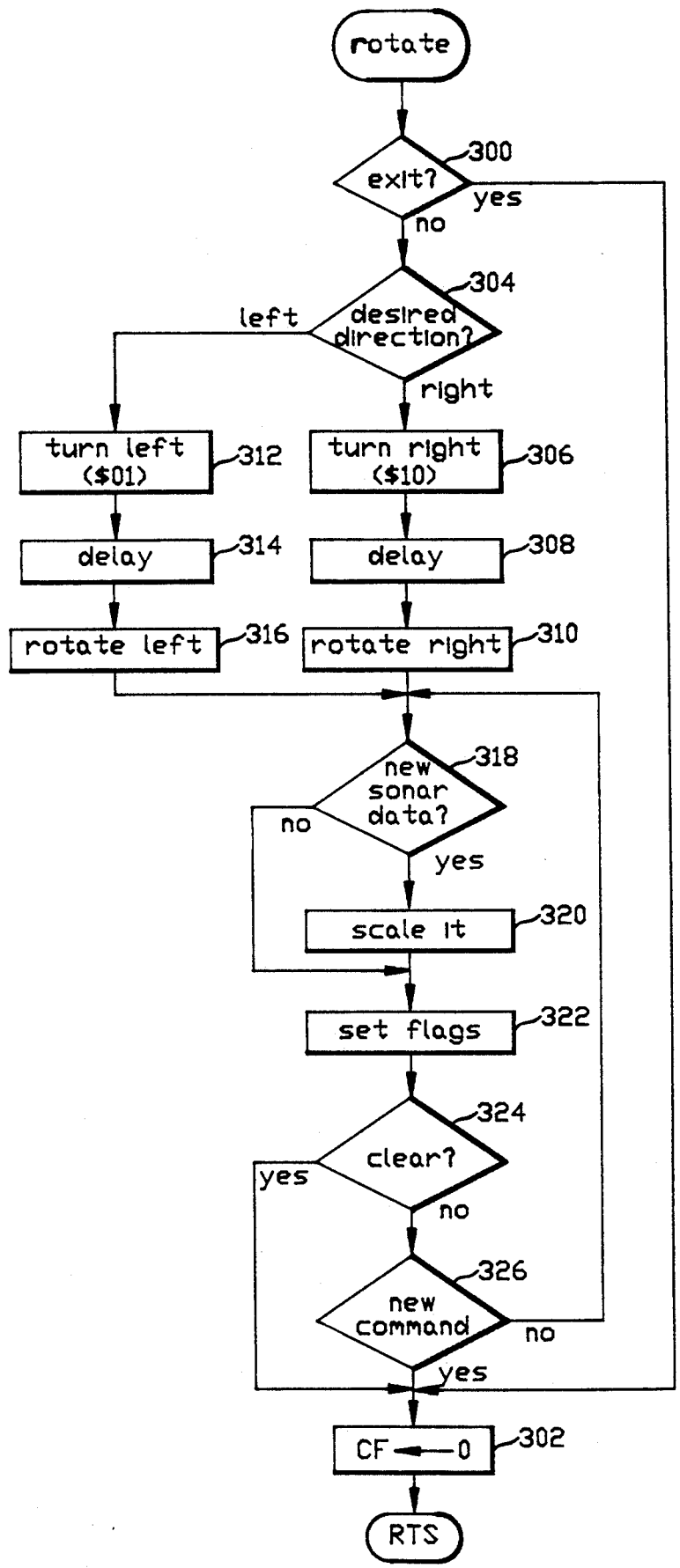
FIG. 18 is a flow chart of the software program "ROTATE".

Subroutine "ROTATE" is described with reference to FIG. 18 as follows: A determination is made at step 300 as to whether the human operator desires to disable the reflexive teleoperated control mode. If that determination is "YES", then at step 302, "CF" is set equal to "0" and "ROTATE" returns to the calling program "AVOID". If, however, the determination at step 300 is NO, then a determination is made at step 304 as to whether the human operator previously specified turning vehicle 16 to the left or right. If a preferential right turn was specified, then at step 306, a turn right step is provided to processor 30 of propulsion module 28. At step 308 a time delay is induced to allow the right motor 52 of propulsion module 28 to decelerate. Then at step 310 an instruction to rotate right is provided to processor 30.

If the determination at 304 is that a left avoidance turn is desired, then at step 312, a "turn left" instruction is provided to processor 30. A time delay is again induced at step 314 and a "rotate left" instruction is provided to processor 30 at step 316. From steps 310 or 316 "ROTATE" proceeds to step 318 where a determination is made as to whether new sonar data from any of ultrasonic transducers $536_{3, 4, 5, 7,}$ and $_8$ have been received by processor 26. If that determination is "YES", then the new sonar data is scaled to a single byte at step 320. If the determination at step 318 is NO then "ROTATE" proceeds to step 322 where the subroutines "SON.FLG" and "PRX.FLG" are called.

Next, at step 324 a determination is made as to whether or not data from any of ultrasonic transducers $536_{3-5}$ and near-infrared sensors $60_{3-5}$ indicate the absence of obstacles. If that determination is NO, a decision is made at step 326 to determine whether or not a new command has been entered through numeric keypad 15. If the determination at step 326 is NO, "ROTATE" loops back to continue step 318. If, however, the determination at step 326 is "YES", then "RO- TATE" continues at step 302. If the determination at step 324 is "YES", then "rotate" continues directly to step 302 and returns to "AVOID".

SEEK FIG. 19]

Figure 19:
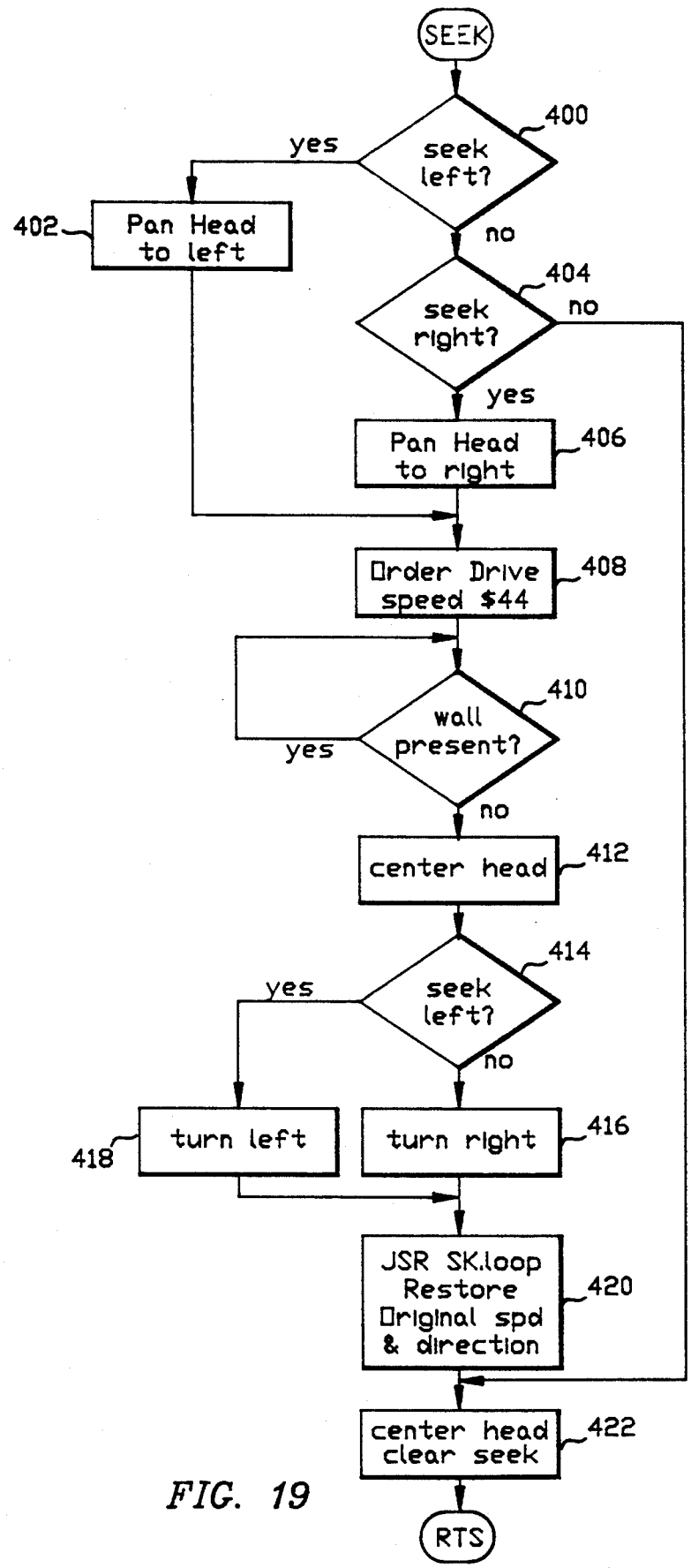
FIG. 19 is a flow chart of the software program "SEEK".

As previously discussed with reference to FIG. 19, if the decision at step 118 of WANDER is NO, then the subroutine "SEEK" is called. Subroutine "SEEK" checks to see if the operator has requested a "seek-left" or "seek-right" maneuver, and is discussed with reference to FIG. 10. At step 400 a determination is made as to whether a "seek-left" command has been received. If the determination at step 400 is "YES", then at step 402, head pan axis controller 52 is directed to pan left, as for example, 80 degrees from the center reference position, in order to find an opening in the wall so that vehicle 16 may turn and pass through it. If the determination at step 400 is "NO", then a determination is made at step 404 as to whether a "seek-right" command has been received. If that determination is "YES", then at step 406, head pan axis controller 52 is directed to pan right, as for example 80 degrees from the reference position in order to search for an opening in the wall so that vehicle 16 may turn and pass through it. If the determination at step 404 is "NO", then "SEEK" proceeds to step 422, described further herein. After the implementation of either steps 402 or 406, propulsion module 28 receives a drive speed instruction of "$44", provided by step 408, regardless of what the command speed of vehicle 16 had been.

Next, head-mounted infrared sensor $60_6$ begins to look to see if a wall or opening is present. If a wall is present, "SEEK" loops around step 410 until such time as a wall is not present. During this time, vehicle 16 is moving at speed 4—4 in a straight line next to the wall. Once an opening has been detected, step 412 provides an instruction to head pan axis controller 52 to center head 62. Since camera 42 is mounted to head 62, the operator can visually confirm whether there is, indeed, an opening such as a doorway, there.

A check is made at step 414 to reexamine the WANDER parameter to determine in which direction the turn has been specified. If the specified turn direction is "right", then step 416 provides a right turn instruction to propulsion module 28. If the specified turn direction is "left", then a "left turn" instruction is provided to propulsion module 28 by step 418. In either event, "SEEK" proceeds to step 420 which is a time delay loop called "LOOP" (described further herein) that also checks for several conditions. Once step 420 has been completed, "SEEK" proceeds to step 422 which provides an instruction to pan axis controller 52 in order to center head 62, and an instruction to propulsion module 28 to restore the original speed of vehicle 16. "SEEK" then is exited, and normal reflexive teleoperated control is resumed.

SK.LOOP [FIG. 20]

Figure 20:
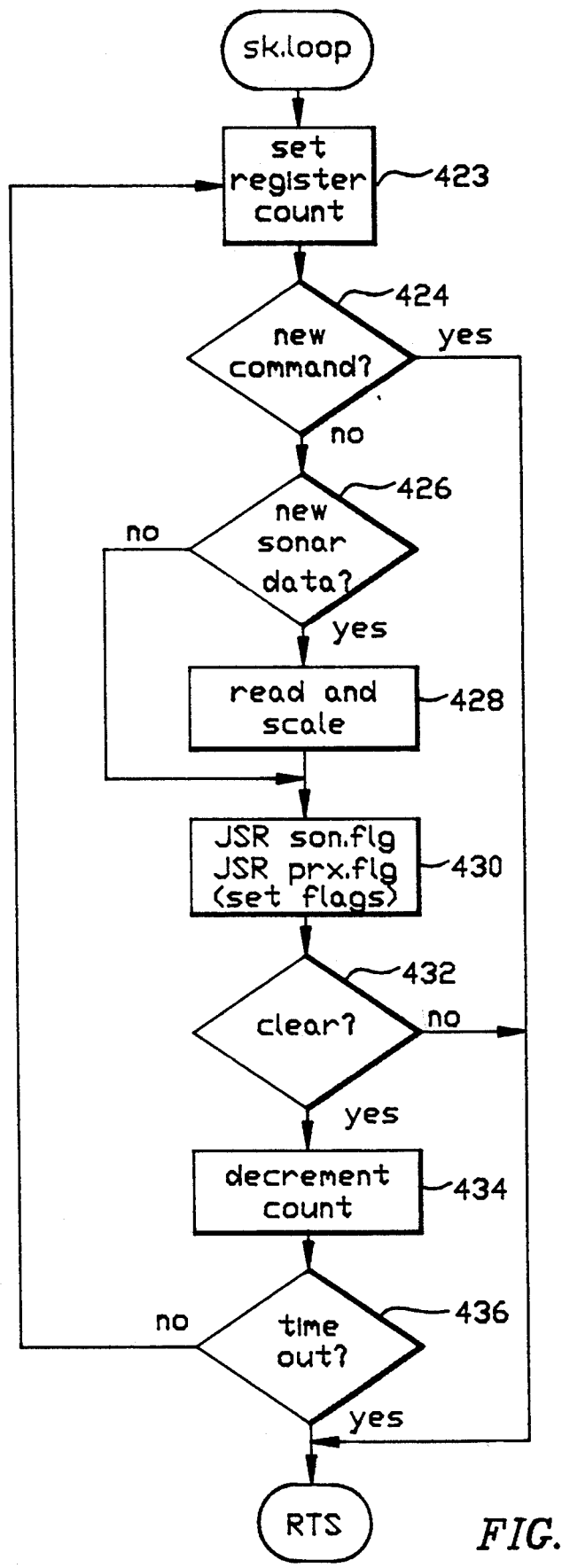
FIG. 20 is a flow chart of the software program "SK.LOOP".

The subroutine SK.LOOP is describe with reference to FIG. 20. The purpose of this subroutine is to provide vehicle 16 with enough time to turn and be properly aligned with the detected opening in a wall. SK.LOOP is basically a delay loop, but also has two conditional checks which it makes: the first is to ascertain the presence of any obstacles to the path of vehicle 16; the second is to determine if a new command has come down from the operator, because if the operator observes something in video receiver 50 that he does not like, he may order vehicle 16 to halt, thereby kicking vehicle 16 out of the reflexive mode.

Still referring to FIG. 11, SK.LOOP first sets a register called COUNT at step 423. COUNT is loaded with a predetermined value that determines the number of times SK.LOOP will loop before kicking out to the calling subroutine SEEK. The value of COUNT is set to enable vehicle 16 to make a turn of approximately 90 degrees. Next, SK.LOOP determines at step 424 if a new command from the operator has been received by local processor 26. If that determination is "YES", SK.LOOP is exited. If that determination is "NO", then a further determination is made at step 426 to ascertain the presence of new data from sonar subsystem 38. If the determination at step 428 is "YES", then the new sonar data is read and scaled at step 430 by subroutines SON.FLG and PRX.FLG, respectively. These subroutines are discussed further herein. Step 430 also sets flags in the collision status register. The collision status register represents, in one byte, the potential collisions that have been observed by the sensors, near-infrared proximity sensor $60_i$ and/or ultrasonic transducers $536_i$.

The collision status register is checked at step 432. If that register is clear, then no potential obstruction has been detected, and the subroutine proceeds to step 434. If the register is not clear, an obstruction to the path of vehicle 16 has been detected. In this latter case, the program exits SK.LOOP and processor 26 reverts back to the reflexive mode. If the determination at step 432 is that the collision status register is clear, then the subroutine proceeds to step 434 which decrements the value of the loop counter. At step 436, the loop counter is checked to determine if it is timed out, i.e., the counter is equal to zero. If not, the subroutine loops back to step 423 to reexecute SK. LOOP. If the counter is timed out, the subroutine exits and returns to "SEEK". However, the scope of the invention also comprehends limits on the number of degrees that vehicle 16 may turn other than are specifically described herein.

SON.FLG [FIG. 21]

Figure 21:
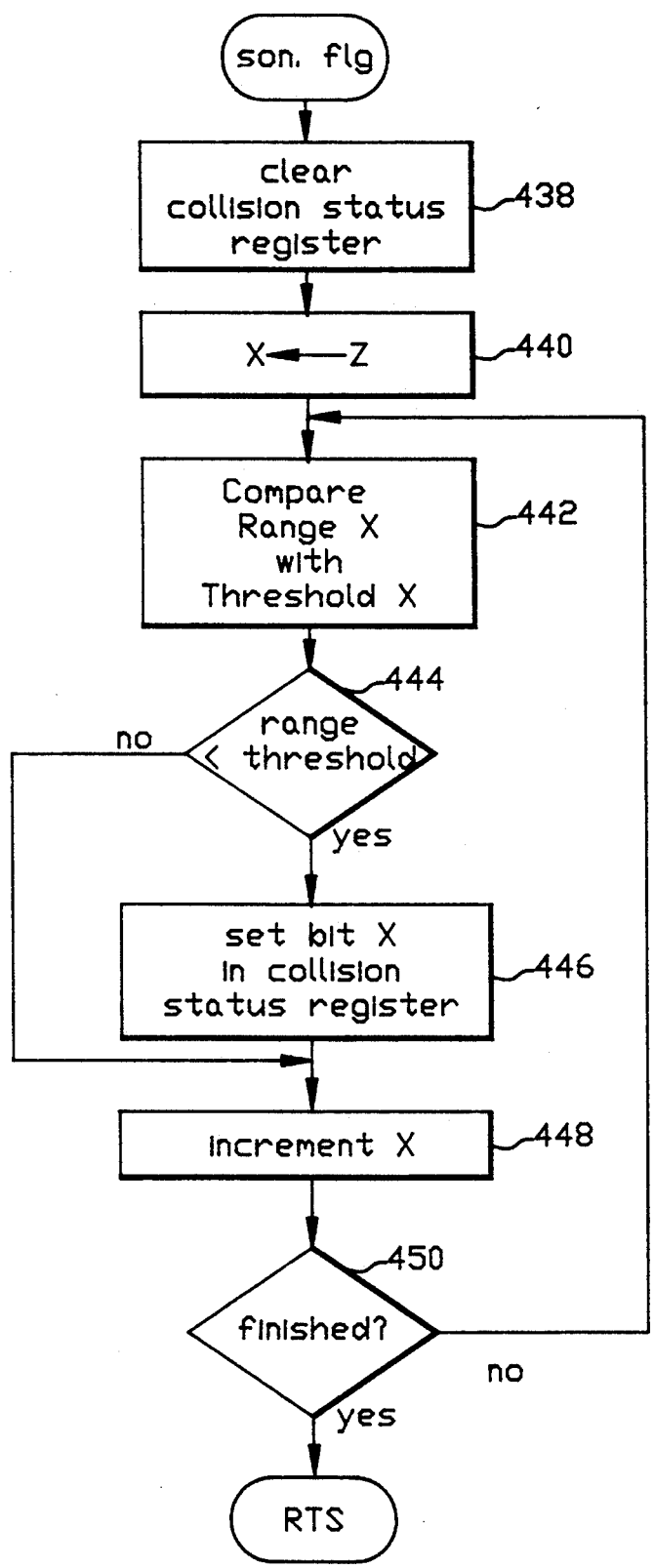
FIG. 21 is a flow chart of the software program "SON.FLG".

The subroutine SON.FLG, described with reference to FIG. 21, checks the outputs from sonar subsystem 38 for potential obstructions and sets appropriated flags that indicate the status of outputs of ultrasonic transducers $536_i$ in the "collision status" register ("COL.STA"). Step 438 clears the collision status register to purge it of old data. All collision status flag bits are set to "0". Step 440 sets the sonar transducer index so that SON.FLG. can execute in a loop to serially examine the outputs of ultrasonic transducers $536_i$. At step 442, the data provided by a particular ultrasonic transducer $536_i$, where i represents a particular transducer, is compared with a threshold value stored in a look-up table. Transducers $536_7$, $536_8$, $536_3$, $536_4$, and $536_5$ each have a unique look-up table so that the values of the data they provide can be correlated with a specific range to an obstacle. The look-up tables are stored in local processor 26. If the range value is less than the threshold, then a potential collision is indicated. In this case, bit X in the collision status register is set equal to "1" at step 446 indicating that ultrasonic transducer X detects a potential collision. Then, at step 448, the incremental value of X is indexed. If the determination at step 44 is that the range is not less than the threshold, SON.FLG proceeds directly to step 448. At step 450, the index of X is examined to determine if data from all of transducers $536_i$ have been evaluated. If so, SON.FLG returns to the calling program SK.LOOP; if not, then SON.FLG loops until the index X indicates that the program is finished.

PRX.FLG [FIG. 22]

Figure 22:
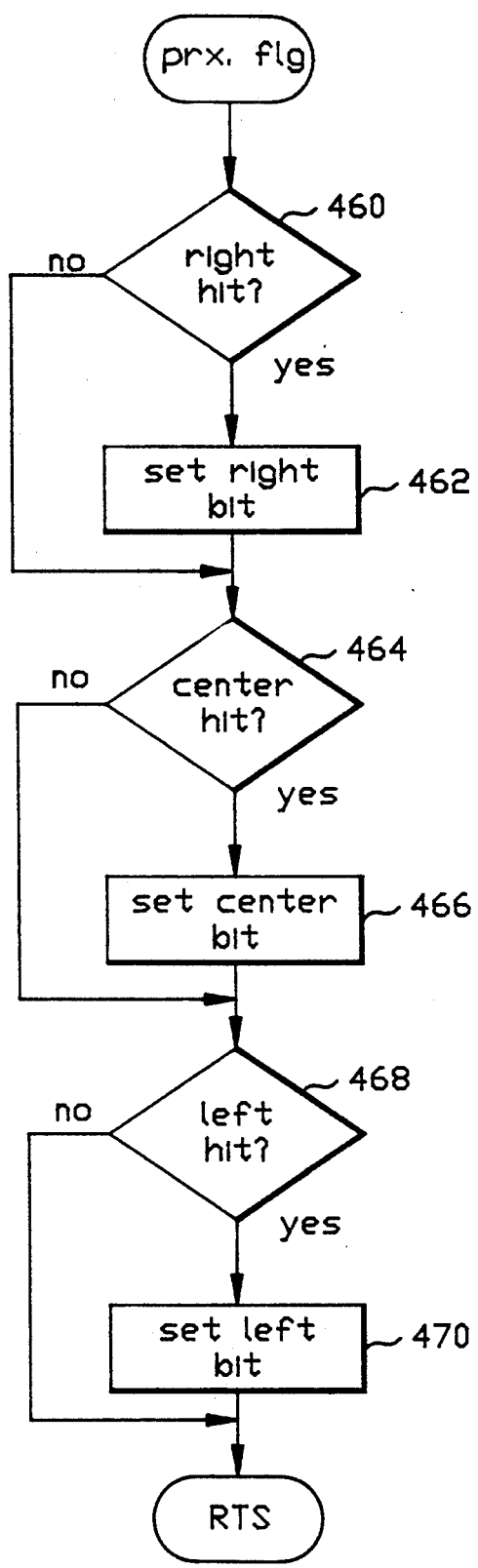
FIG. 22 is a flow chart of the software program "PRX.FLG".

Referring to FIG. 22, subroutine PRX.FLG also sets bits in the status collision register, "COL.STA", using a logical "OR" operation, which are based on the outputs of near-infrared proximity sensors $60_i$. Since SON.FLG and PRX.FLG are called back to back, processor 26 is evaluating the world through two different sensor systems, whereby the resulting data is fused into one flag register that subsequently represents a composite picture. At step 460, a determination is made as to whether near-infrared proximity sensor $60_3$ detects a reflection of its emitted energy. If so, then step 462 sets the right bit to [1], and the program proceeds to step 464. If the determination at step 460 is no, the program proceeds directly to step 464. At step 464, a determination is made as to whether near-infrared proximity sensor $60_3$ detects a reflection of its emitted energy. If so, then step 466 sets the center bit to [1], and the program proceeds to step 468. If the determination at step 464 is "NO", the program proceeds directly to step 468. At step 468, a determination is made as to whether near-infrared proximity sensor $60_5$ detects a reflection of its emitted energy. If so, then step 470 sets the left bit to [1], and the program is exited.

In the preferred embodiment, the data from ultrasonic transducers $536_i$, having a particular index, effects the same bits in the collision status register that are affected by the data from near-infrared proximity sensors $60_i$, having the same index. The near-infrared proximity sensors are mounted directly below their corresponding ultrasonic transducers. They look out into the same area in front of vehicle 16. For example, data from right near-infrared proximity sensor $60_3$ is going to set the same bit that would be set by data from right ultrasonic transducer $536_3$. Data from center near-infrared proximity sensor $60_4$ sets the same bit that data from ultrasonic transducer $536_4$ sets. Likewise, data from left near-infrared proximity sensor $60_5$ sets the same bit as does data from left ultrasonic transducer $536_5$.

FLG.DCD [FIG. 14]

Figure 14:
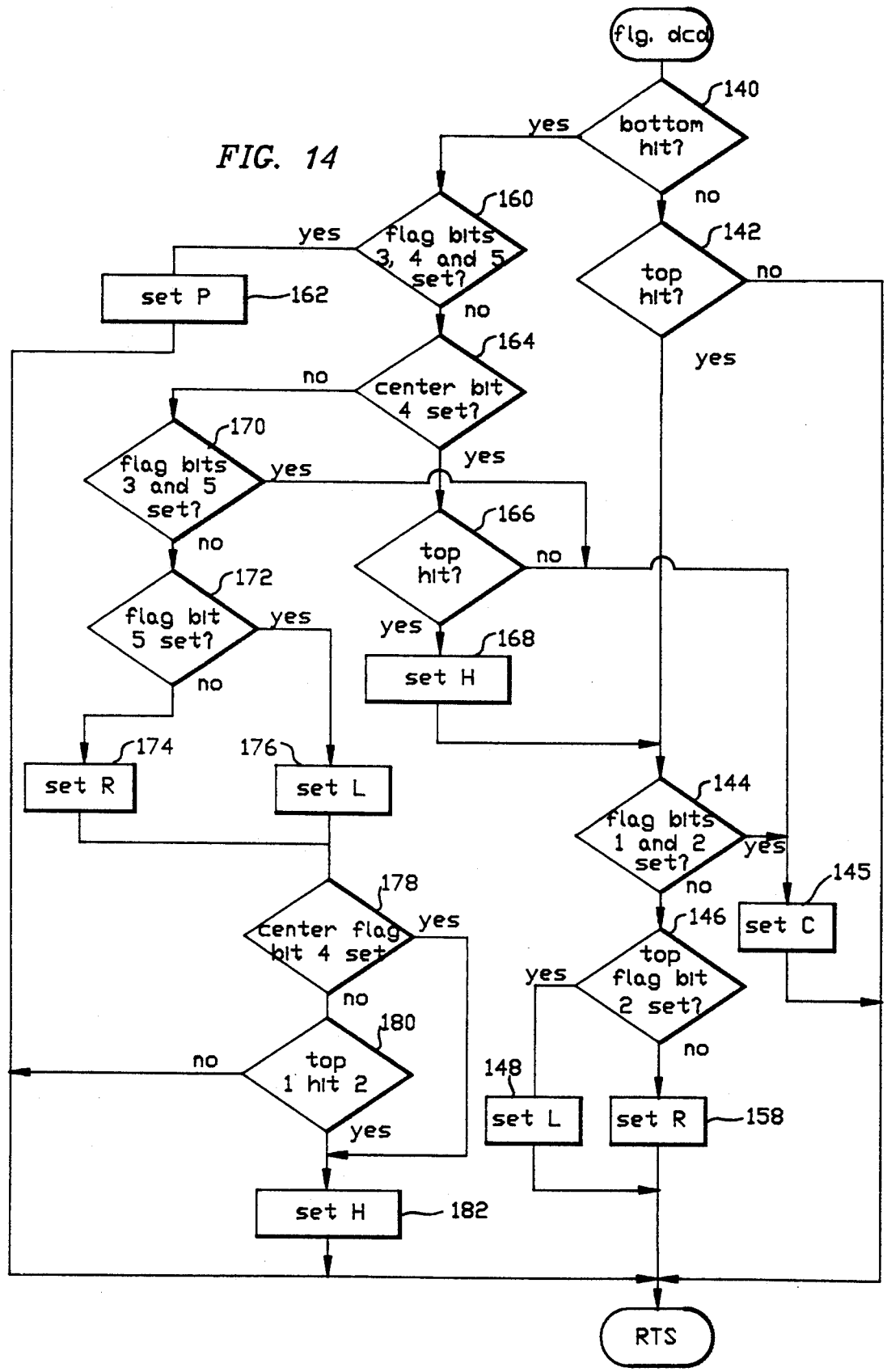
FIG. 14 is a flow chart of the software program "PARSER".

The next subroutine that operates on the data stored in the collision flag register is flag decode (FLG.DCD), illustrated in FIG. 14. This subroutine decodes the flags in the collision status register so as to specify the appropriate avoidance maneuver, which is passed to subroutine "AVOID" in the form of special flag bits set in a "response register." FLG.DCD examines the collision status register which, again is the composite picture of potential collisions around vehicle 16, and decodes that register and sets the second register which is basically the response register. So, based on what the picture looks like, FLG.DCD sets flags in the response register. The flags in the response register are used to enable vehicle 16 turn left or right, or rotate in place in order to avoid the obstacles.

Obviously, many modifications and variations of the present invention are possible in light of the above teachings. It is therefore to be understood that within the scope of the appended claims, the invention may be practiced otherwise than as specifically described.

We claim:

1. A control system for a remotely controlled vehicle, comprising:

a servo-controlled vehicle;

first means operably disposed to receive supervisory speed and heading commands from a human operator and which provides host speed and turn rate commands to said vehicle for directing said vehicle to maneuver at a speed and turn rate in accordance with said supervisory speed and heading commands, said host speed and turn rate commands defining a path;

second means mounted to said vehicle for detecting an obstruction to said path, said second means including multiple sensors for detecting said obstruction; and third means operably couped to said first and second means, and to said vehicle, said third means for disabling said host speed and turn rate commands in response to said second means detecting said obstruction, for generating obstacle avoidance speed and turn rate commands which are provided to said vehicle for directing said vehicle to travel in accordance with said obstacle avoidance speed and turn rate commands to avoid said obstruction, and for enabling said host speed and turn rate commands after said obstruction is avoided so that control of said vehicle is returned to said human operator, where:

the magnitude of said obstacle avoidance speed command is proportional to a first distance between one of said sensors detecting said obstruction and said obstruction when said first distance is within a first predetermined limit; and the magnitude of said turn rate command is inversely proportional to an angle defined between an operator desired vehicle heading and a relative bearing to a detected obstruction, when said detected obstruction is within a second distance from said vehicle.

2. The control system of claim 1 wherein said multiple sensors include:

fourth means operably coupled to said third means for transmitting near-infrared energy and detecting some of said near-infrared energy that reflects off of said obstruction; and fifth means operably coupled to said third means for transmitting ultrasonic pulses in the direction of said obstruction and detecting some of said ultrasonic pulses that reflect off of said obstruction.

3. The control system of claim 2 wherein:

said fourth means includes a plurality of near-infrared sensors arranged in a first pattern; and said fifth means includes a plurality of selectively-enabled ultrasonic transducers arranged in a second pattern.

4. The control system of claim 3 wherein said first means includes:

an input device for receiving said supervisory speed and bearing commands from said human operator; and a host computer operably coupled to said input device for transforming said supervisory speed and heading commands into said host speed and turn rate commands.

5. The control system of claim 4 which further includes:

a communication link between an operator station and said third means comprising:

a first transceiver operably coupled to said host computer; and a second transceiver communicatively linked to said first transceiver and operably coupled to said third means.

6. The control system of claim 5 wherein:
said third means includes a digital data processor.

7. The control system of claim 6 which further includes:
a servo-controlled video camera rotatable about an axis and mounted to said vehicle for detecting video images in the direction of said motion of said vehicle;
sixth means mounted to said vehicle and operably coupled to said digital data processor and to said video camera for selectively rotating said video camera about said axis;

8. The control system of claim 7 wherein:
said sixth means is a head pan axis controller.

* * * * *